US007827772B2

(12) United States Patent
Baker

(10) Patent No.: US 7,827,772 B2
(45) Date of Patent: Nov. 9, 2010

(54) MARKING ASSEMBLY

(75) Inventor: Brent Baker, Stratford (CA)

(73) Assignee: Simplistic Lines Inc., Stratford, Ontario (*) Notice: Subject to any disclaimer, the term of this patent is extended or adjusted under 35 U.S.C. 154(b) by 102 days.

(21) Appl. No.: 12/209,752

(22) Filed: Sep. 12, 2008

(65) Prior Publication Data

US 2010/0065292 A1 Mar. 18, 2010

(51) Int. Cl.
*A01C 15/00* (2006.01)
*A01D 34/00* (2006.01)

(52) U.S. Cl. ........................................ 56/16.8; 239/663

(58) Field of Classification Search .................. 56/16.4, 56/16.8, 16.9, 255, 295, 121, 15.2, 320.1, 56/320.2; 239/172, 289, 165, 175, 166, 168, 239/666, 663, 670; 222/613, 623–625; 172/126
See application file for complete search history.

(56) References Cited

U.S. PATENT DOCUMENTS 1,050,669 A 1/1913 Lee
4,011,914 A 3/1977 Elmer
4,821,959 A * 4/1989 Browing ..................... 239/121
5,195,308 A * 3/1993 Grote et al. .............. 56/16.4 R
5,533,676 A * 7/1996 Conley ....................... 239/663
6,053,376 A 4/2000 McGuffie
6,062,443 A 5/2000 Smrt
6,102,305 A 8/2000 Chapman et al.
6,299,934 B1 10/2001 Manning
6,345,772 B1 2/2002 Bastin et al.
7,024,845 B2 4/2006 Kallevig et al.
7,043,890 B2 * 5/2006 Lofton ....................... 56/16.8
7,272,920 B2 9/2007 Wright et al.
7,337,600 B2 3/2008 Kallevig et al.
2007/0224361 A1 9/2007 Bissonnette

OTHER PUBLICATIONS

Model RS-500M Mower Deck Rider, 2003, Riding Field Striping Equipment [online], Tru Mark Athletic Field Marker, [retrieved on Mar. 29, 2008]. Retrieved from the Internet: <URL:www.athleticfieldmarker.com/TN/RS-500M.html>.
Model RS-500 New Chassis for 2003 [online], Tru Mark Athletic Field Marker, [retrieved on Mar. 29, 2008]. Retrieved from the Internet: <URL:www.athleticfieldmarker.com/TN/RS-500.html>.

* cited by examiner

*Primary Examiner*—Robert E Pezzuto

(57) ABSTRACT

A marking assembly for attachment to a vehicle for distributing a marking agent on a substantially grass-covered field to mark one or more lines in one or more predetermined areas thereof. The marking assembly includes a deck having a grass-cutting subassembly for mowing the grass and removing the cuttings thereof to provide freshly-mown grass in the predetermined area, the deck being attachable to the vehicle. The marking assembly also includes one or more nozzle subassemblies positionable downstream relative to the grass-cutting subassembly when the vehicle travels in a forward direction. The nozzle subassembly includes one or more nozzles for releasing the marking agent to mark the line on the predetermined area.

16 Claims, 17 Drawing Sheets

MARKING ASSEMBLY

FIELD OF THE INVENTION

This invention is related to a marking assembly for distributing a marking agent to mark lines on a field.

BACKGROUND OF THE INVENTION

Athletic field markings, generally (although not necessarily exclusively) provided in the form of lines, are made on substantially grass-covered fields so that one or more particular sports may be played thereon. As is known, the athletic field markings usually are made by applying a marking agent (e.g., paint) to the grass. The marking agent should be applied when the grass is generally at a height of approximately two inches or less. If the grass is longer than two inches, the marking agent is unable to penetrate closer to the roots of the grass, with the result that grass with the marking agent thereon is cut off relatively quickly. In these circumstances, re-application of the marking agent is required sooner, rather than later. Because applying athletic field markings tends to be a somewhat time-consuming task, it can be relatively costly.

Accordingly, the field typically is cut (and the grass cuttings are removed) shortly before the athletic field markings are applied. In the prior art, of necessity, this process is done with at least two different units, namely:

(a) one or more lawn mowers for cutting the grass and removing the cuttings; and (b) a device for applying the athletic field markings to the grass, after the grass has been cut and the cuttings have been removed.

As a result, in the prior art, the relevant parts of the field are generally traveled over twice, i.e., once to cut the grass, and a second time to apply the markings.

SUMMARY OF THE INVENTION

For the foregoing reasons, there is a need for an improved marking assembly which at least mitigates one or more of the foregoing disadvantages of the prior art.

In its broad aspect, the invention provides a marking assembly for attachment to a vehicle for distributing a marking agent on a substantially grass-covered field to mark one or more lines in one or more predetermined areas thereof. The marking assembly includes a deck having a grass-cutting subassembly for mowing the grass and removing the cuttings thereof to provide freshly-mown grass in the predetermined area of the field, the deck being attachable to the vehicle. The marking assembly also includes one or more nozzle subassemblies positionable downstream relative to the grass-cutting subassembly when the vehicle travels in a forward direction. The nozzle subassembly includes one or more nozzles for releasing the marking agent to mark the line on the predetermined area of the field.

In another of its aspects, the invention provides a marking assembly for attachment to a marking vehicle for releasing a marking agent on a substantially grass-covered field to mark one or more lines in one or more predetermined areas thereof. The marking assembly includes an arm pivotably attached at a pivot end thereof to the marking vehicle, the arm being adapted to pivot about an axis, the arm extending between the pivot end and a nozzle end thereof. The marking assembly also includes a movable nozzle subassembly mounted to the arm at the nozzle end, the movable nozzle subassembly including one or more nozzles to which the marking agent is supplied. The nozzle is adapted for releasing the marking agent to mark the line on the predetermined area of the field.

In another aspect, the nozzle is adapted for releasing the marking agent to mark a line at least partially along an arc defined by pivoting movement of the nozzle subassembly about the axis.

In another of its aspects, the invention provides a marking vehicle for releasing a marking agent on a substantially grass-covered field to mark one or more lines in one or more predetermined areas thereof. The marking vehicle includes a vehicle portion movable in a forward direction, and a deck having a grass-cutting subassembly for mowing the grass and removing the cuttings thereof to provide freshly-mown grass in the predetermined area of the field, the deck being attachable to the vehicle portion. The marking vehicle also includes one or more nozzle subassemblies positionable downstream relative to the grass-cutting subassembly when the vehicle portion travels in the forward direction. The nozzle subassembly includes one or more nozzles for releasing the marking agent to mark the line on the predetermined area of the field.

BRIEF DESCRIPTION OF THE DRAWINGS

The invention will be better understood with reference to the attached drawings, in which.

DETAILED DESCRIPTION

Figure 1A:
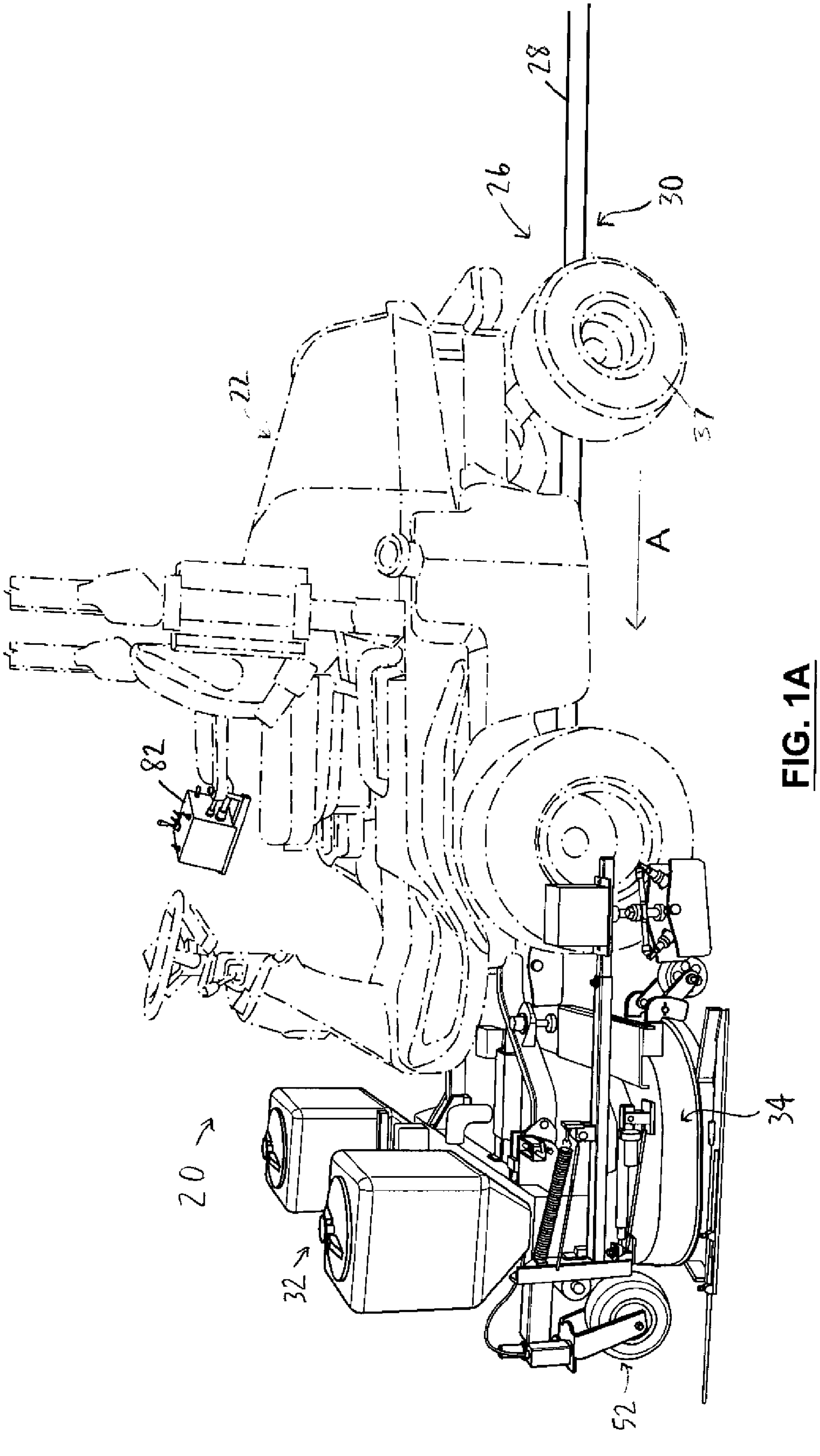
FIGS. 1A and 1B are is an isometric view, from a side, of an embodiment of a marking assembly of the invention.

Reference is first made to FIGS. 1A, 2A-4C and 9 to describe an embodiment of a marking assembly of the invention indicated generally by the numeral 20. The marking assembly 20 is for attachment to a vehicle 22 for distributing a marking agent 24 (FIG. 3A) on a substantially grass-covered field 26 to mark one or more lines 28 in at least in one or more predetermined areas 30 thereof. In one embodiment, the marking assembly 20 includes a deck 32 with a grass cutting subassembly 34 for mowing the grass and removing the cuttings thereof to provide freshly-mown grass in the predetermined area 30 of the field 26. The deck 32 preferably is attachable to the vehicle 22. The marking assembly 20 preferably also includes one or more nozzle subassemblies 36 (FIG. 3A) positionable downstream relative to the grass-cutting subassembly 34 when the vehicle 22 travels in a forward direction (indicated by arrow "A" in FIG. 1A), as will be described. The nozzle subassembly 36 includes one or more nozzles 38 for releasing the marking agent 24 to mark the line 28 on the predetermined area 30 of the field 26.

The vehicle 22 preferably is a riding lawn mower or tractor suitable for commercial use, as is known in the art. The vehicle 22 is steerable via wheels 37. For clarity of illustration, the vehicle 22 is shown in "ghost" outline in FIG. 1A. The deck 32 and certain other features are shown in solid outline in FIG. 1A. The entire marking assembly 20 is shown in solid outline in FIG. 1B.

The deck 32 preferably includes a deck housing 39, and the grass-cutting subassembly 34 is substantially positioned inside the deck housing 39. The grass-cutting subassembly includes at least one rotatable blade (not shown) inside the housing 39. Preferably, in order to activate the grass-cutting subassembly 34, the vehicle's power take-off is engaged, causing a drive shaft 35 (FIG. 2) connecting the vehicle 22 to the grass-cutting subassembly 34 to rotate. To de-activate the grass-cutting subassembly 34, the power take-off is disengaged. As the grass-cutting subassembly is well known in the art, it is not necessary to describe it in more detail.

Figure 4A:
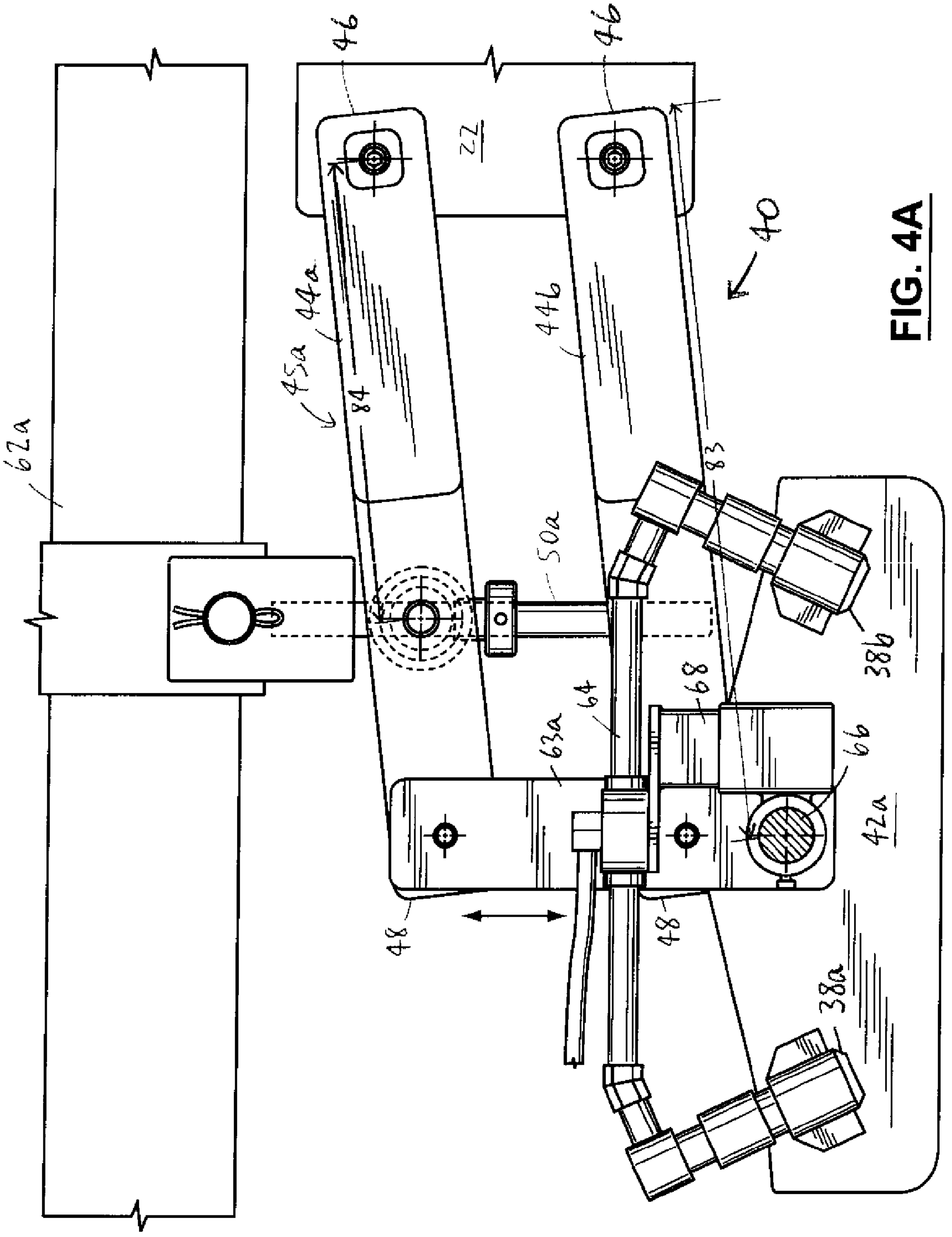
FIG. 4A is a cross-section of the nozzle subassembly of FIG. 3A taken along line 4A-4A in FIG. 3A, drawn at a larger scale.

As can be seen in FIG. 4A, the nozzle subassembly 36 preferably includes two nozzles 38*a*, 38*b*. It is also preferred that the nozzles 38*a*, 38*b* are positioned so that, when they are at a first height $d_1$ (as described hereinafter) above the grass, the streams of the marking agent 24 released therefrom respectively and substantially simultaneously engage the grass at substantially the same location thereon, to provide a more thorough application of the marking agent 24. References hereinafter to a single nozzle 38 will be understood as references to the two nozzles 38*a*, 38*b*.

Figure 2:
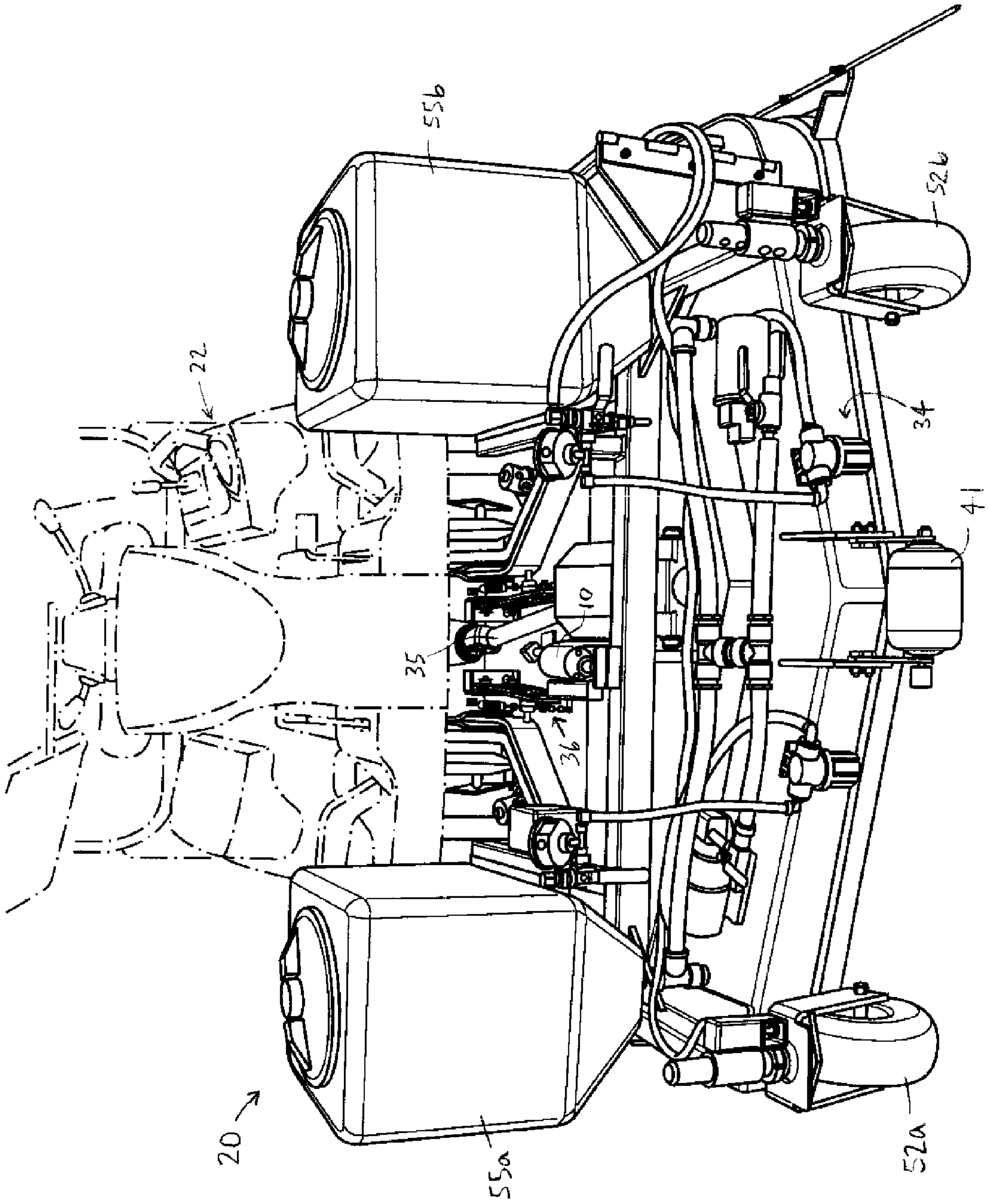
FIG. 2 is an isometric view, from the front, of the marking assembly of FIG. 1.
Figure 3A:
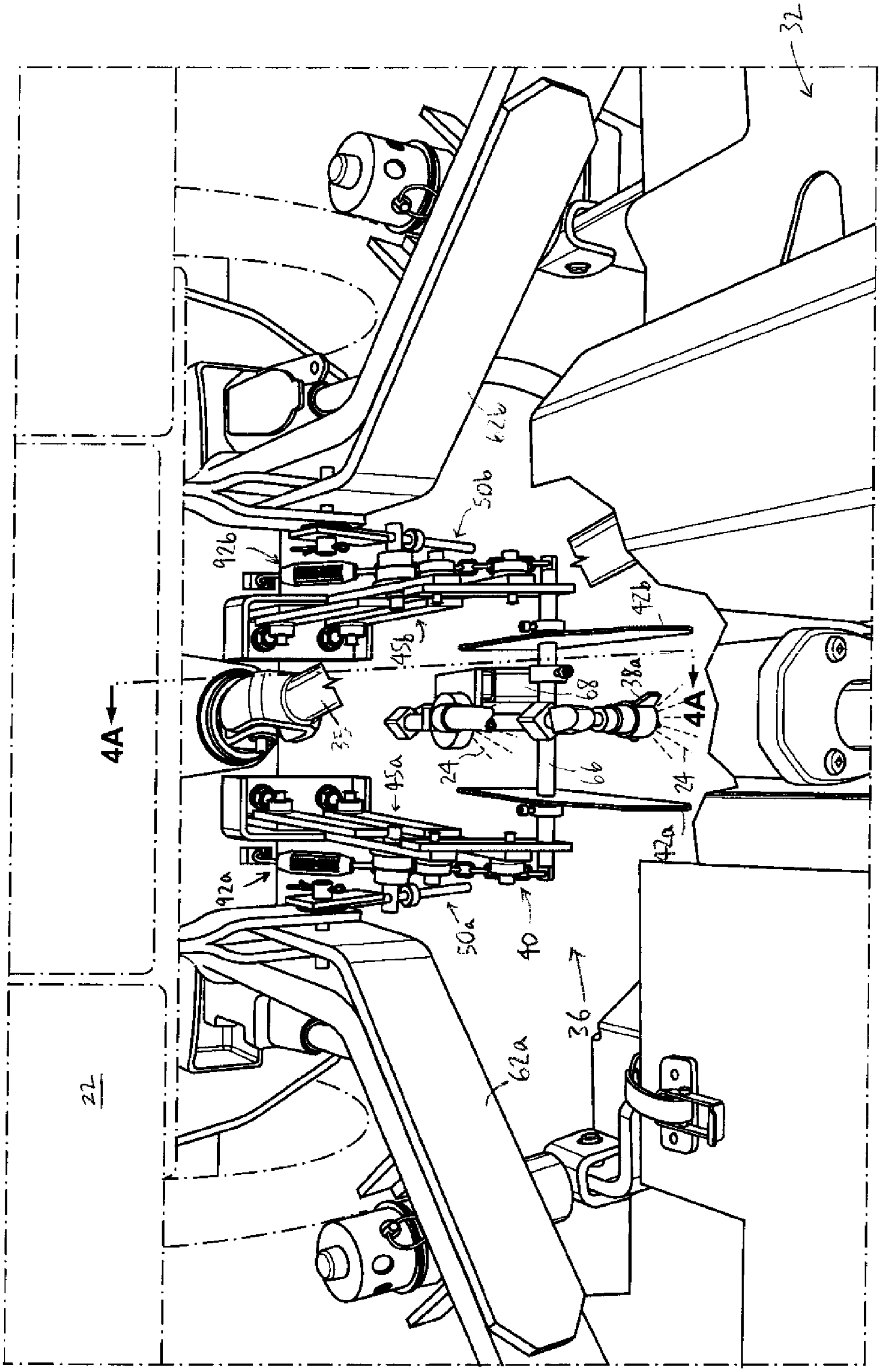
FIG. 3A is an isometric view of an embodiment of a nozzle subassembly of the invention, drawn at a larger scale.
Figure 3B:
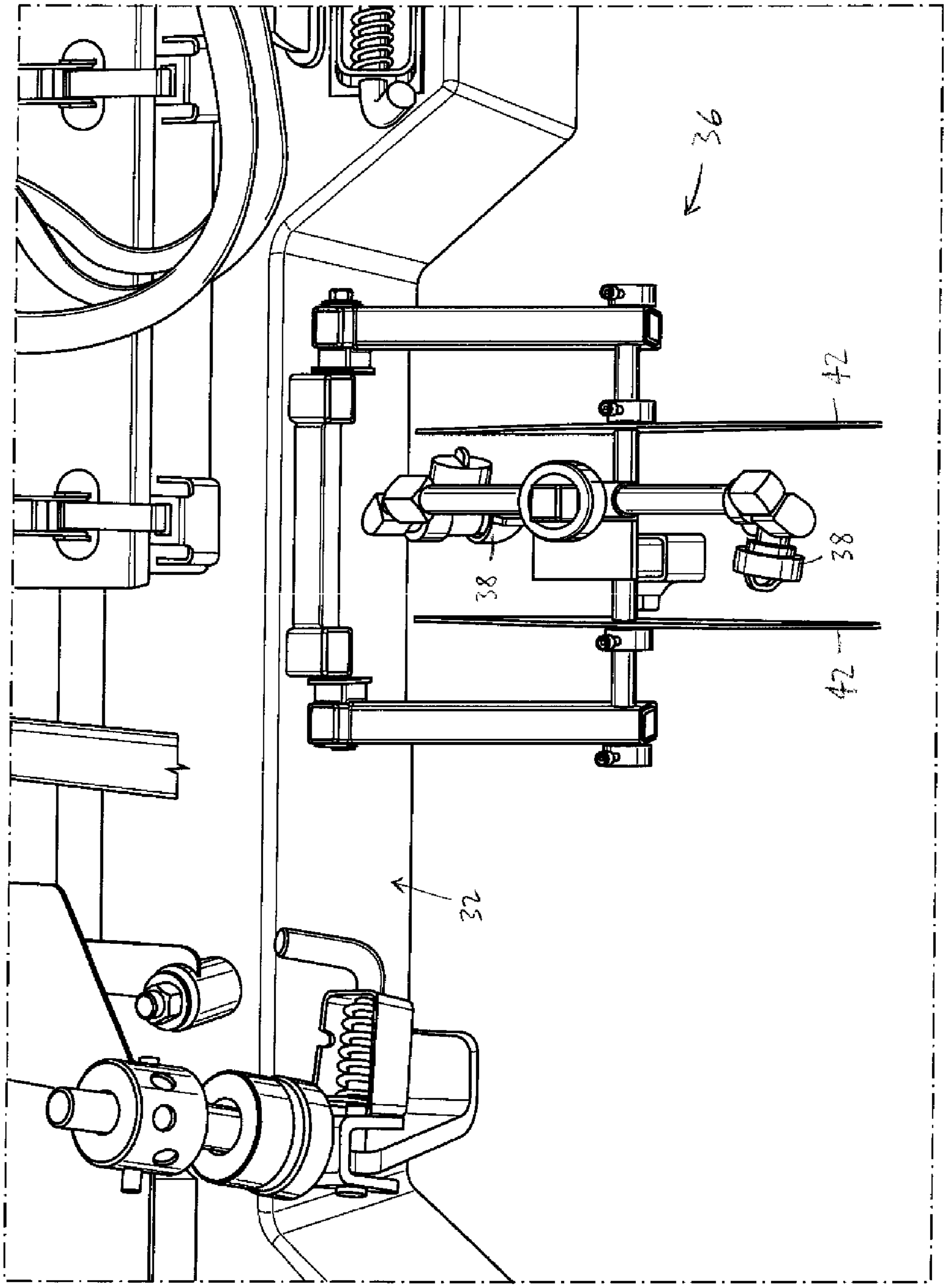
FIG. 3B is an isometric view of an alternate embodiment of the nozzle subassembly of the invention, drawn at a larger scale.

In one embodiment, the nozzle subassembly 36 preferably is mounted on the deck 32 (FIG. 3B). However, it is preferred that the nozzle subassembly 36 is mounted on the vehicle 22, as shown in FIGS. 2 and 3A. In use, it has been found that the vehicle 22 is less prone than the deck 32 to vertical movement while the vehicle 22 and the deck 32 are travelling in the forward direction over the field. Because of this, it has been found to be advantageous to mount the nozzle subassembly 36 on the vehicle 22, rather than on the deck 32, as the nozzle subassembly 36 tends to be more stable (i.e., less prone to vertical movement) during forward movement if the nozzle subassembly 36 is mounted on the vehicle 22. Vertical movement of the nozzle subassembly 36 while the marking agent 24 is being released therethrough is disadvantageous because it tends to result in uneven application of the marking agent 24.

In one embodiment, the deck 32 preferably is movable between a lowered position (FIG. 3C), in which the grass-cutting subassembly 34 is positioned to cut grass on the field, and a raised position (FIG. 3D), in which the grass-cutting subassembly 34 is positioned to substantially avoid engagement thereof with the grass.

As shown in FIGS. 3A and 4A, the nozzle subassembly 36 preferably includes a mounting bracket 40 for attaching the nozzle 38 to the vehicle 22 and one or more shoes 42 for directing the marking agent 24, upon its release from the nozzle 38, to mark the line 28. As can be seen in FIG. 3A, the nozzle subassembly 36 preferably includes two shoes 42*a*, 42*b*, positioned substantially parallel to the forward direction, for limiting the distribution of the marking agent 24 (i.e., once it has been released from the nozzles 38*a*, 38*b*) so that the marking agent is generally applied to form the predetermined line. It has been found that, after its release from the nozzles 38*a*, 38*b* but before its engagement with the grass, the marking agent 24 is prone to "splattering", i.e., engaging the grass off-line, due to wind, or possibly due to irregularities in nozzles. The shoes 42*a*, 42*b* have been found to be advantageous in order to limit the extent to which the marking agent is applied outside the line.

In one embodiment, the mounting bracket 40 includes one or more members 44 extending between proximal and distal ends 46, 48 thereof respectively (FIG. 4A). As can be seen in FIGS. 3A and 4A, the mounting bracket 40 preferably includes two sets 45*a*, 45*b* of members 44 (i.e., one set 45*a* on each side of the nozzles 38*a*, 38*b*, as shown in FIG. 3A, and the other set 45*b* on the other side of the nozzles 38*a*, 38*b*), and each set 45 preferably includes upper and lower members 44*a*, 44*b* which are positioned to form part of a parallel linkage, substantially in the form of a parallelogram.

Preferably, the members 44*a*, 44*b* are pivotally attached to the vehicle 22 at the proximal ends 46 of the members 44*a*, 44*b*. The mounting bracket 40 preferably also includes distal members 63*a*, 63*b*, to which the distal ends 48*a*, 48*b* of the members 44*a*, 44*b* respectively are pivotably attached. As can be seen in FIG. 4A, for instance, a central member 64 to which the nozzles 38*a*, 38*b* are attached preferably is supported in position, and attached to the distal members 63*a*, 63*b*, by a central bracket 68 which is, in turn, supported by a transverse bar 66 (FIGS. 3A, 4A). Preferably, and as can be seen in FIG. 3A, the shoes 42*a*, 42*b* are also mounted on the transverse bar 66, with the central member 64 and the nozzles 38*a*, 38*b* positioned between the shoes 42*a*, 42*b*. It is also preferred that the transverse bar 66 is attached to the distal members 63*a*, 63*b* at a first preselected distance 83 from the proximal ends 46 (FIG. 4A).

Figure 4B:
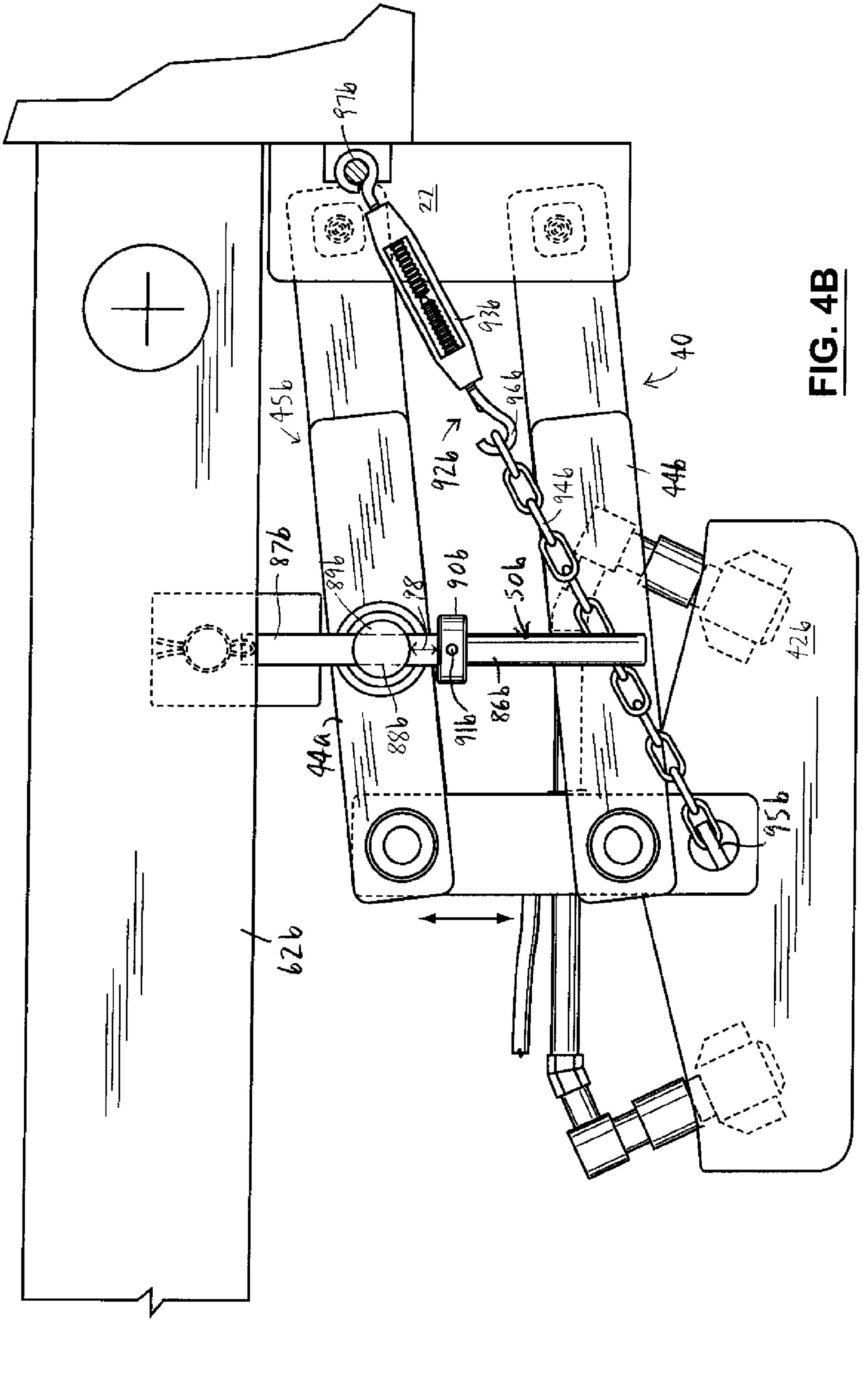
FIG. 4B is a side view of the nozzle assembly of FIG. 3A, in an operational position.
Figure 4C:
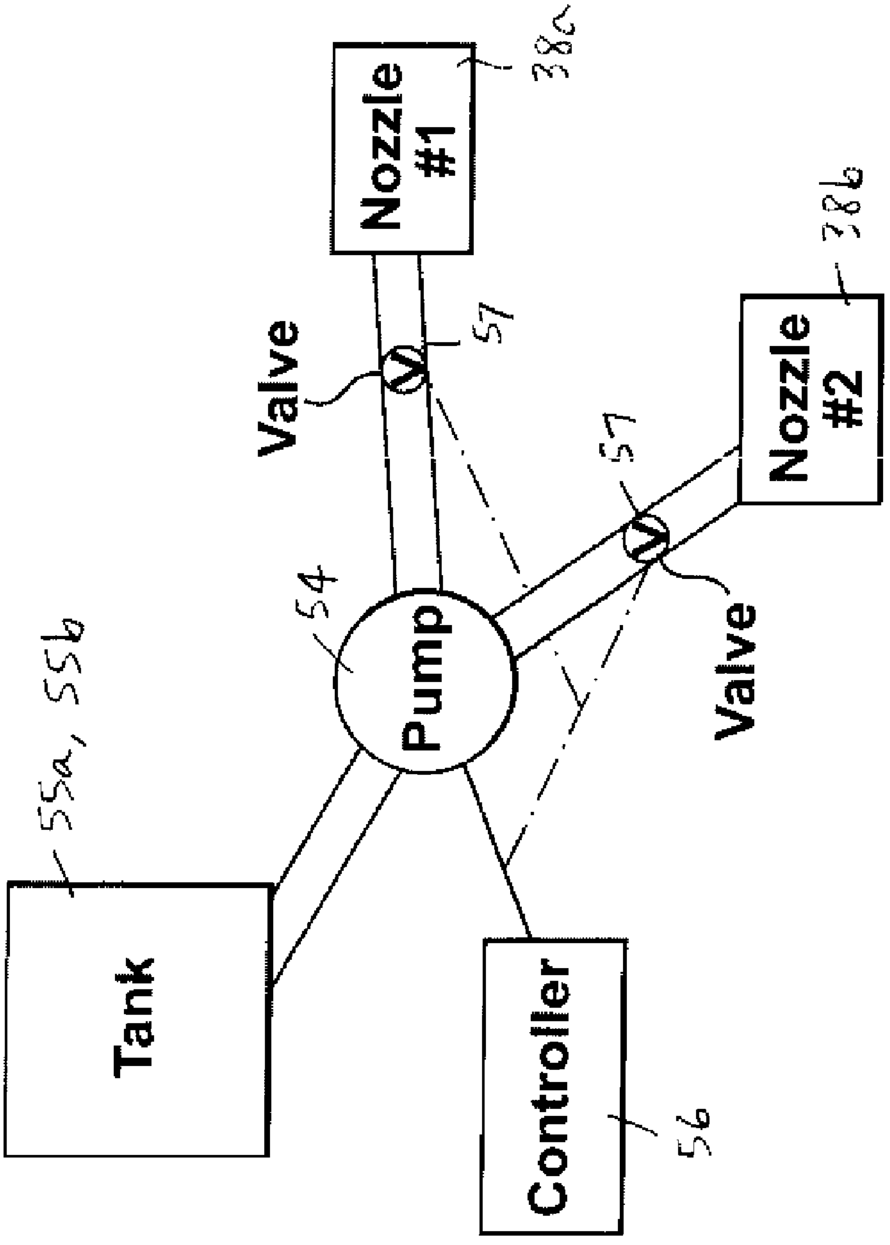
FIG. 4C is a schematic illustration of selected components of an embodiment of the marking assembly of the invention.

Only one set 45*a* of the members 44 is shown in FIG. 4A. The other set 45*b* is the mirror image of the set 45*b*, and is substantially the same as the set 45*a* in all material respects (FIG. 4B).

Preferably, the mounting bracket 40 also includes one or more connecting elements 50*a*, 50*b* attachable to the upper member(s) 44*a* at a second preselected distance 84 from the proximal end 46 (FIGS. 3A, 4B), as will be described. As can be seen in FIGS. 3A, 3C, 3D, and 4B, the connecting elements 50*a*, 50*b* preferably are attached to arms 62*a*, 62*b* which attach the deck 32 to the vehicle 22.

As shown in FIG. 3A, it is preferred that two arms 62*a* and 62*b* join the deck 32 to the vehicle 22 respectively, and two connecting elements 50*a*, 50*b* connect the members 44*a*, 44*b* to the arms 62*a*, 62*b* respectively. For convenience, however, reference is made to only one arm 62, and it will be understood that the description is equally applicable to arms 62*a* and 62*b*.

In one embodiment, the first preselected distance 83 preferably is approximately 8.25 inches (209.55 mm.), and the second preselected distance 84 is approximately 6.25 inches (158.75 mm.).

Preferably, each connecting element 50*a*, 50*b* is adapted for adjustment of the lowered and raised positions of the mounting bracket 40. As can be seen in FIG. 4B, the connecting element 50*b* preferably includes a rod 86*b* pivotably attached to the arm 62*b* at the rod's upper end 87*b*. The rod 86*b* preferably passes through a hole 88*b* in the stop member 89*b* mounted on the upper member 44*b*. The connecting member 50*b* preferably also includes a stop 90*b* positionable on the rod 86*b* at any desired position. Preferably, the stop 90*b* is securable to the rod 86*b* by a set screw 91*b*.

As can be seen in FIG. 4B, when the mounting bracket 40 is in the operational position, the stop 90*b* preferably is not engaged with the stop member 89*b*. Instead, it is preferred that the mounting bracket's distal end is substantially supported by an adjustable operational position device 92*b*. The device 92*b* preferably includes a turnbuckle 93*b* and a chain 94*b* extending between an end 96*b* of the turnbuckle 93*b* and a plug 95*b* attached to the distal member 63*b*. As can be seen, for example, in FIG. 4B, an end 97*b* of the turnbuckle 93*b* preferably is pivotably attached to the vehicle 22. (The device 92*a* is not shown in FIG. 4A for clarity of illustration.)

When the deck 32 is moved to the lowered position, the operator preferably determines whether the devices 92*a*, 92*b* are required to be adjusted in order to position the nozzles 38*a*, 38*b* at a first predetermined height $d_1$, above the freshly-mown grass. The position of the nozzles 38*a*, 38*b* relative to the grass is adjusted by adjustment of the length of the turnbuckles 93*a*, 93*b*, i.e., by shortening or lengthening the turnbuckles 93*a*, 93*b*. The mounting bracket 40 preferably is suspended by the devices 92*a*, 92*b* when the mounting bracket 40 is in the operational position. Gaps 98 between the stop members 89*a*, 89*b* and the stops 90*a*, 90*b* results from the suspension of the mounting bracket 40 by the devices 92*a*, 92*b*.

Figure 3C:
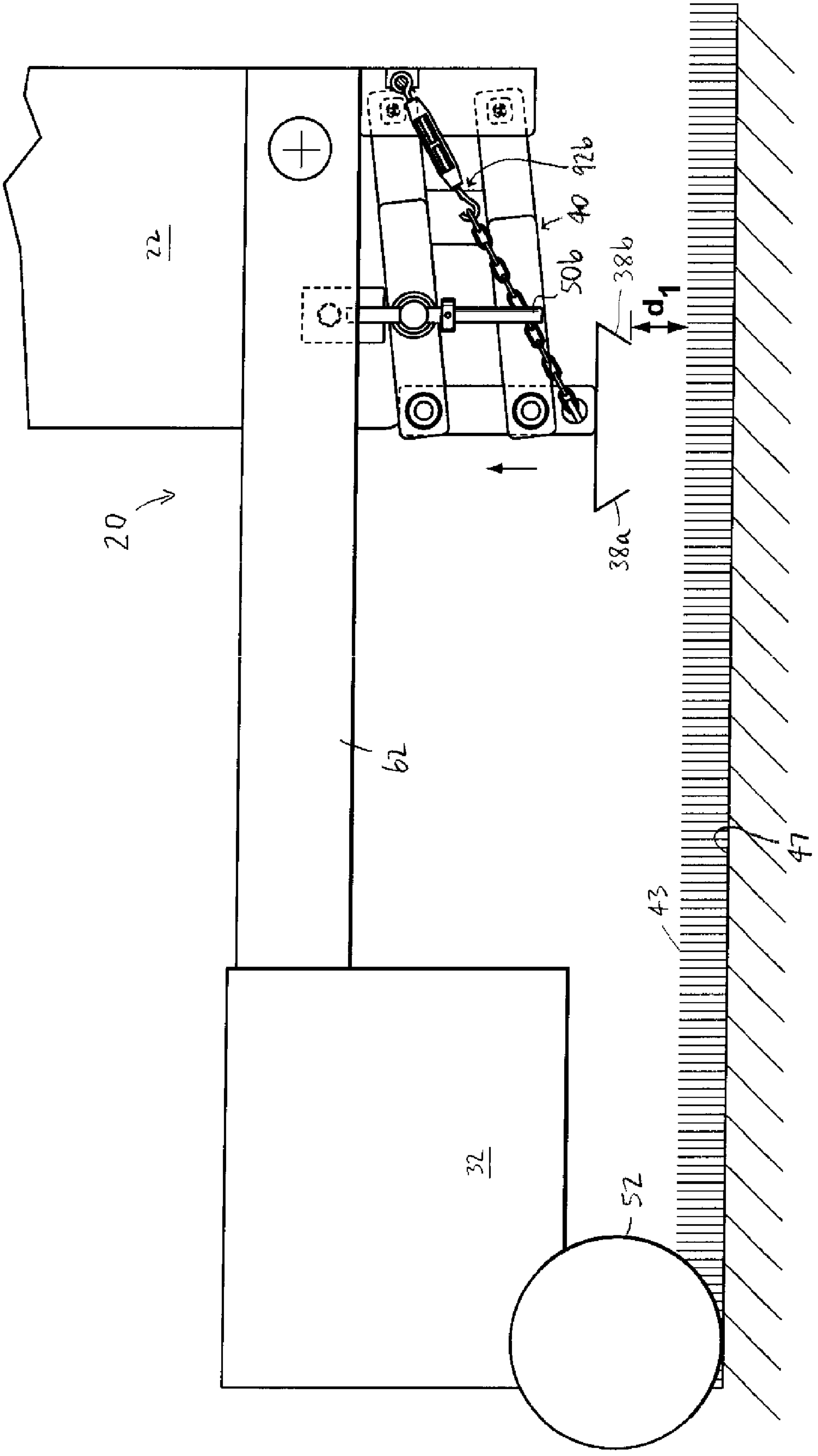
FIG. 3C is a schematic illustration of the nozzle subassembly of FIG. 3A, drawn at a smaller scale, in which the deck is in a lowered position.
Figure 3D:
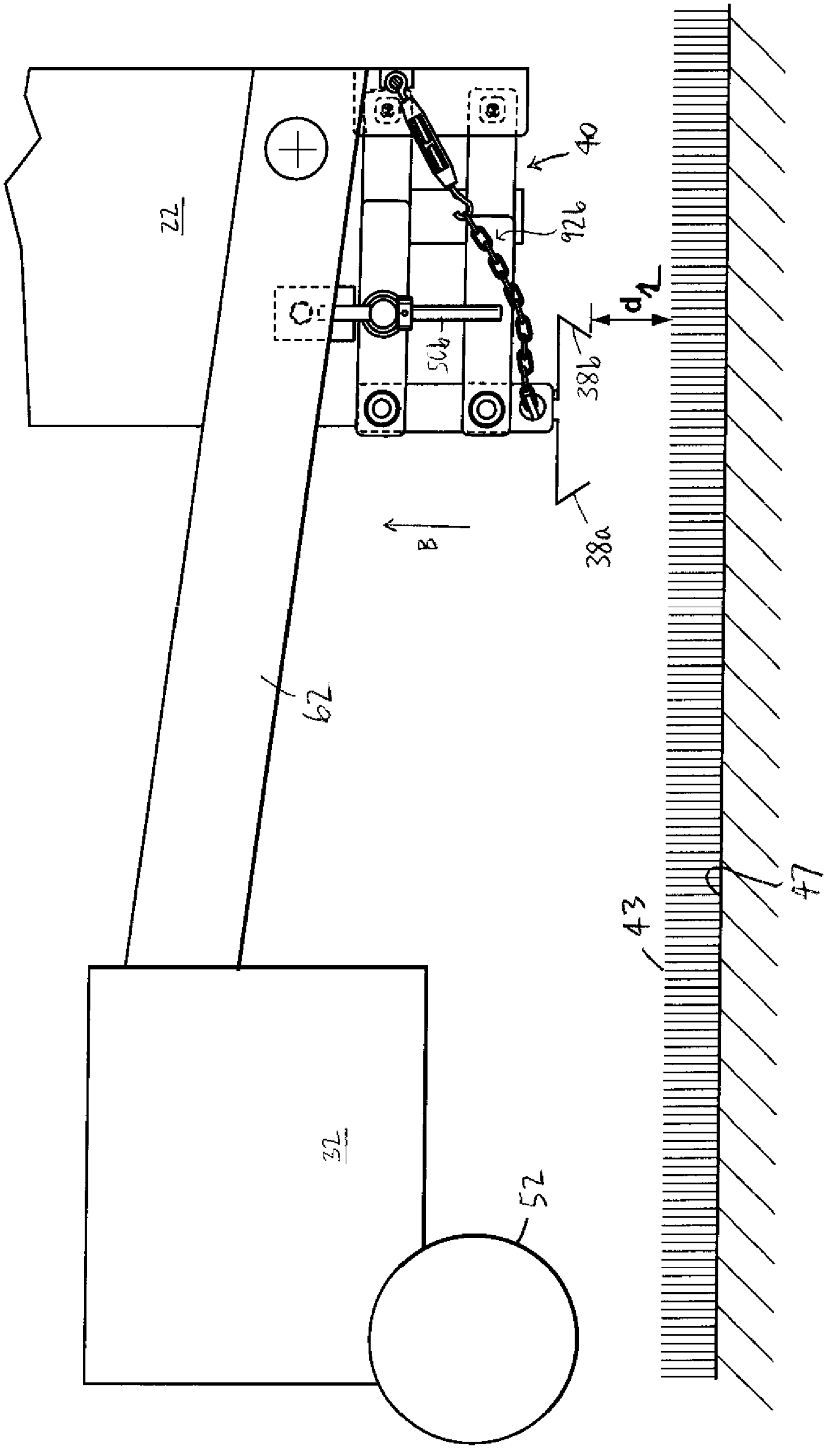
FIG. 3D is a schematic illustration of the nozzle subassembly of FIG. 3C in which the deck is in a raised position.

Also, the devices 92*a*, 92*b* and the connecting elements 50*a*, 50*b* preferably are adjusted so that, when the deck 32 is moved to the raised position, the stops 90*a*, 90*b* are engaged with the stop members 89*a*, 89*b* respectively, so that the rods 86*a*, 86*b* (and the stops 90*a*, 90*b*) connect the stop members 89*a*, 89*b* and the arms 62*a*, 62*b*, to enable the arms 62*a*, 62*b* to lift the mounting bracket 40. Preferably, when the stops 90*a*, 90*b* engage the stop members 89*a*, 89*b*, the devices 92*a*, 92*b* slacken (FIG. 3D). As the arms 62*a*, 62*b* are raised, due to the connection by the connecting elements 50*a*, 50*b*, the mounting bracket 40 pivots upwardly at its distal end as well, as indicated by arrow "B" in FIG. 3D.

Preferably, the mounting bracket 40 is positionable in an operational position (FIG. 4B), in which the nozzles 38*a*, 38*b* are positioned substantially at a first predetermined height $d_1$ above the field to mark the line thereon when the deck 32 is in the lowered position. As can be seen in FIG. 3D, when the deck 32 is raised to the raised position, the nozzles 38*a*, 38*b* are positioned at a second height $d_2$ above the field (i.e., so that the shoes 42*a*, 42*b* are spaced apart from the field).

Preferably, $d_1$ is approximately 1.5 inches (38.1 mm.). It is also preferred that $d_2$ is approximately 5 inches (127 mm.). As a practical matter, although the nozzle subassembly 36 should preferably be raised as far above the grass 43 as possible when the deck 32 is in the raised position, the position of the pto drive shaft 35 (FIGS. 2, 3A) above the nozzle subassembly 36 limits the extent to which the nozzle subassembly 36 can be raised.

From the foregoing, it can be seen that the suspension of the mounting bracket 40 by the devices 92*a*, 92*b* has the benefit that the mounting bracket 40, when in the operational position, "floats", i.e., it is vertically movable, to a limited extent. As can be seen in FIG. 4B, the gap 98 permits upward movement of the arms 62*a*, 62*b* to take place without disturbing the suspended position of the mounting bracket 40. In particular, when one or both of the wheels 52 and/or the roller 41 encounter raised bumps on the field, the deck 32 is generally lifted, resulting in corresponding upward movement of the arms 62*a*, 62*b*. To the extent that the distance which the arms 62*a*, 62*b* are lifted is less than or equal to the gap 98, therefore, the occasional upward movement of the arms 62*a*, 62*b* due to irregularities in the field as the marking assembly 20 proceeds in the forward direction does not affect the position of the nozzles 38*a*, 38*b*. If the upward movement of the arms 62*a*, 62*b* is less than or equal to the gap 98, then the nozzles 38*a*, 38*b* remain at approximately $d_1$ above the freshly-mown grass 33. As well, once the deck 32 is lifted due to uneven ground conditions, the arrangement shown, for example, in FIGS. 4A and 4B permits downward movement of the arms 62*a*, 62*b* without affecting the position of the mounting bracket 40. Accordingly, when the mounting bracket 40 is in the operational position, the mounting bracket 40 is adapted to remain in a predetermined position (i.e., the operational position) during vertical movement of the deck 32.

This arrangement also is helpful when small bumps in the field are encountered by the shoes 42*a*, 42*b*. The mounting bracket 40 is liftable, to accommodate such bumps.

As can be seen in FIGS. 3A, 4A, and 4B, it is preferred that the mounting bracket 40 is supported by two connecting elements 50*a*, 50*b* (i.e., one positioned on each side of the mounting bracket 40) when the mounting bracket 40 is in the lowered and raised positions. It is also preferred that, when the mounting bracket 40 is in the operational position, the mounting bracket 40 is at least partially supported by two devices 92*a*, 92*b*, i.e., one positioned on each side of the mounting bracket 40. These arrangements are preferred due to the stability which they provide, i.e., to enable the mounting bracket to remain largely stable notwithstanding laterally-directed forces (or partially laterally-directed forces) to which the mounting bracket 40 may be subjected. In particular, the connecting elements 50*a*, 50*b* assist in maintaining the mounting bracket 40 in position while the mounting bracket 40 is in the operational position.

In one embodiment, the marking assembly 20 also includes one or more wheels 52 for at least partially supporting the deck 32 above the field 26. As can be seen in FIG. 2, in one embodiment, the marking assembly 20 preferably includes two wheels 52*a*, 52*b*. Preferably, the marking assembly 20 additionally includes a wheel lock system 53 for locking the wheels 52*a*, 52*b* into locked positions respectively (FIG. 9), so that the locked wheels 52*a*, 52*b* guide the deck 32 substantially in the forward direction.

As can be seen in FIG. 2, the marking assembly 20 preferably also includes a roller 41 positioned between the wheels 52*a*, 52*b* to support the deck 32. Preferably, the roller 41 is mounted so that it is not pivotable about a vertical axis.

The wheel lock system 53 is designed to help guide the marking assembly 20 on a substantially straight path, in order to permit the substantially straight lines 28 to be marked. In the absence of the wheel lock system 53, in practice, it is difficult for the operator to avoid undesirable sudden deviations from the intended substantially straight path which the marking assembly 20 is intended to follow. Without the wheel lock system 53, the operator is only able to provide a substantially straight marked line by constant vigilance, and frequent corrections in the direction steered. When the wheels 52 are locked into position by the wheel lock system 53, the operator is more easily able to achieve the substantially straight lines 28 which are typically required, with less chance of operator error.

Figure 9:
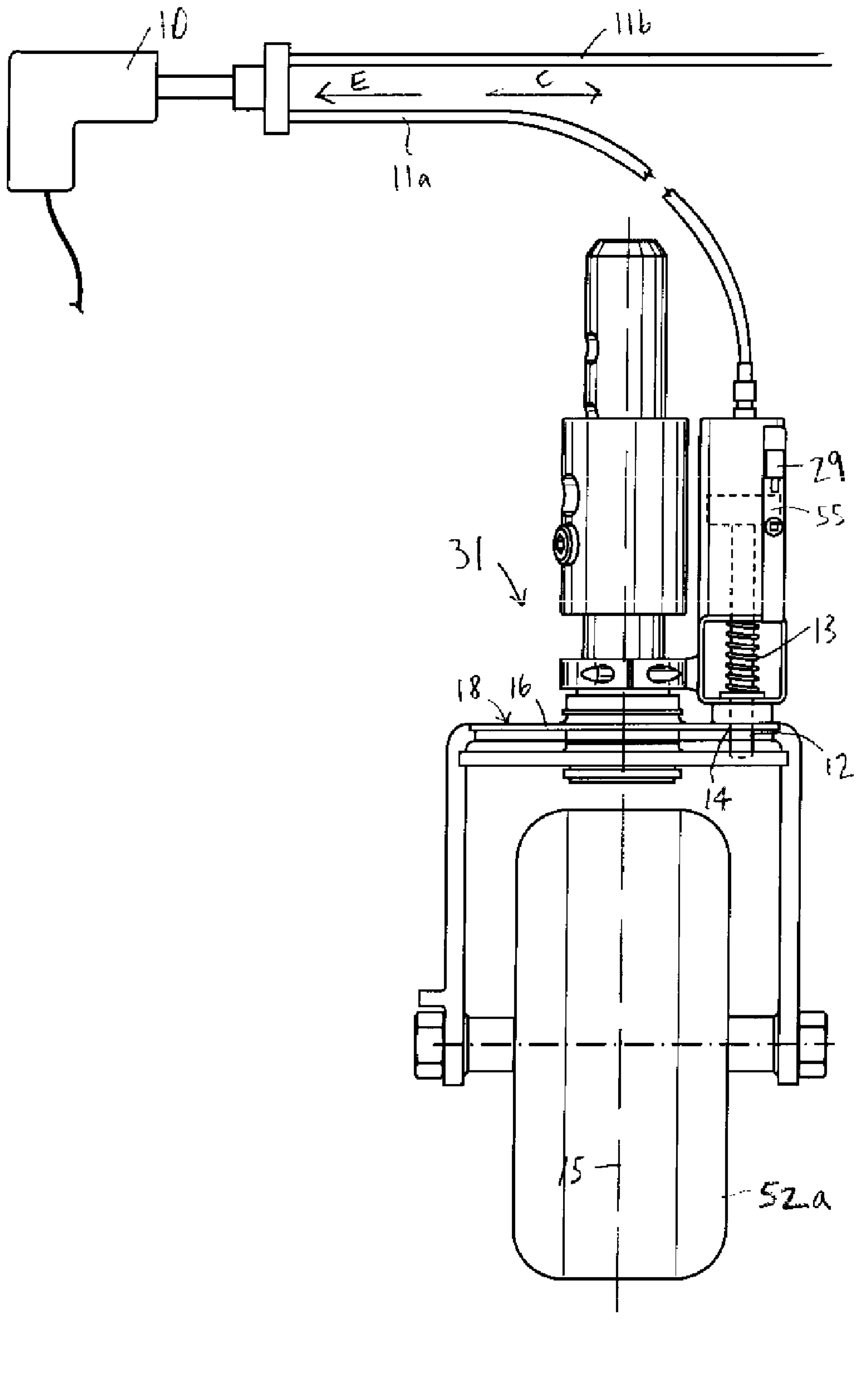
FIG. 9 is a front view of an embodiment of a wheel subassembly of the marking assembly of the invention, drawn at a larger scale.

As can be seen in FIG. 9, the wheel 52 preferably is included in a wheel subassembly 31 in which the wheel 52 is mounted within a wheel caster frame 18.

In order to lock the wheels 52, the system 53 is first electrically energized when a "lock" switch 29 is closed. An electric lock activator 10 (FIGS. 2, 9) extends, i.e., cables 11*a*, 11*b* are released, to allow a locking pin 12 to lower, with spring 13 assist. Upon release of the cables 11*a*, 11*b*, they are allowed to move in the direction indicated by arrow "C". If the wheel 52 is aligned for straight travel, then the locking pin 12 slides downwardly (i.e., in the direction indicated by arrow "D" in FIG. 9) into a mating bushing hole 14 to restrain the wheel from rotation about a vertical axis 15 (FIG. 9). The wheel 52 is shown in an aligned position in FIG. 9.

However, if the wheel 52 is not aligned when the locking pin 12 is extended, the locking pin 12 rides on a top surface 16 of the wheel caster frame 18 until the wheel 52 is aligned, allowing the locking pin 12 to move into the bushing hole 14.

Figure 10:
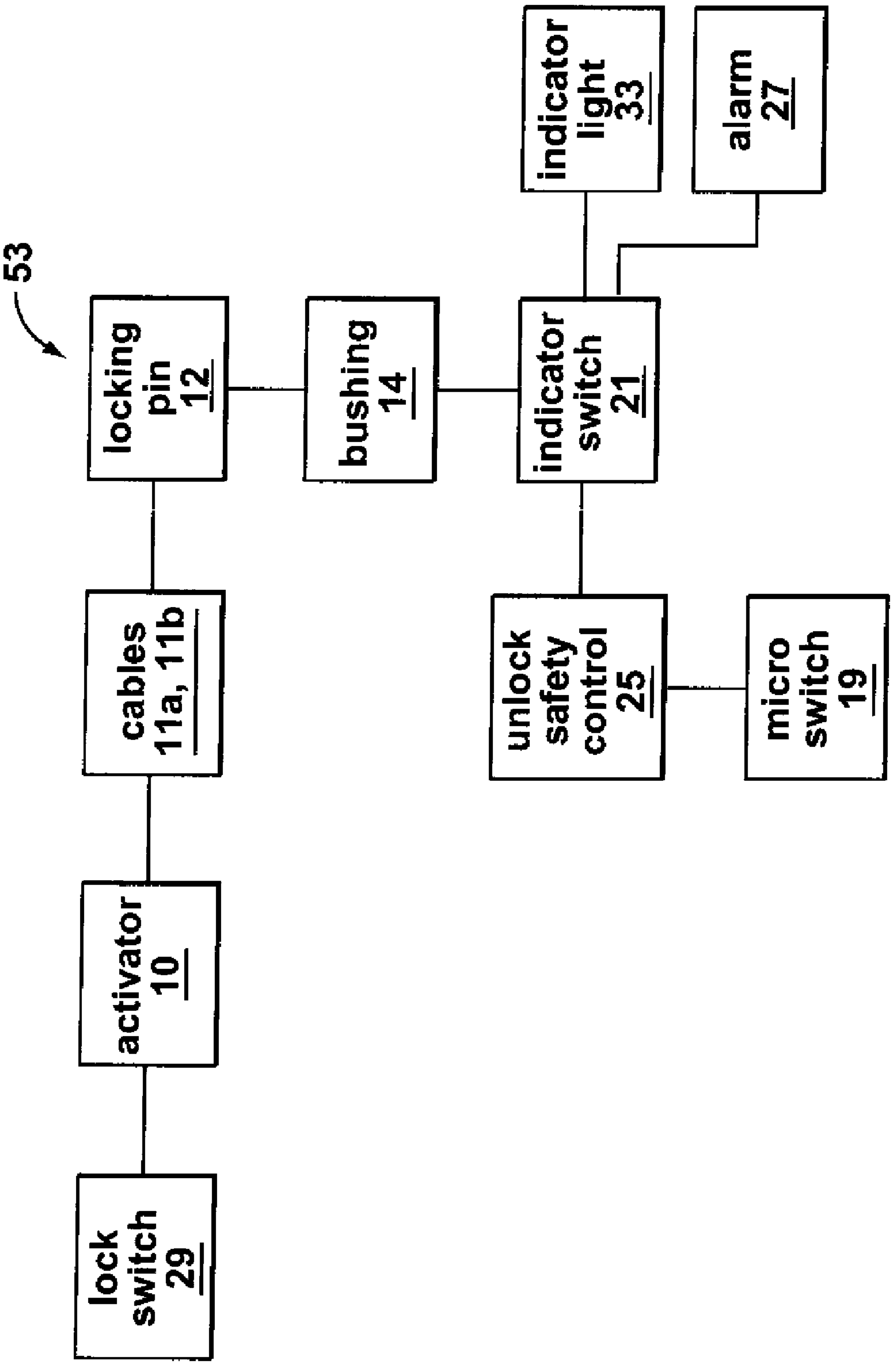
FIG. 10 is a schematic illustration of an embodiment of a wheel lock system of the invention.

Preferably, the wheel lock system 53 also includes an indicator switch 21. It is also preferred that, when the locking pin 12 is positioned in the bushing hole 14 for a particular wheel, the indicator switch 21 is closed, thereby completing an electric circuit (not shown) to cause an indicator light 33 for that wheel on the control panel 82 to be energized (FIG. 10). For instance, because the marking assembly 20 preferably includes two wheels 52*a*, 52*b*, the control panel 82 preferably includes indicator lights 33 for each wheel 52*a*, 52*b* respectively. This enables the operator conveniently to confirm that each wheel 52*a*, 52*b* is locked.

Preferably, when the indicator switch 21 is closed, an unlock safety control 25 and an alarm 27 are also energized (FIG. 10). The unlock safety control 25 prevents unlocking of the wheels unless the deck 32 is raised to (or above) a minimum pre-set height. (Determination of the position of the deck relative to the pre-set height is described further below). This feature precludes the possibility of attempting to unlock the wheels 52*a*, 52*b* while the wheels 52*a*, 52*b* are subjected to side pressures which may cause the pin 12 to bind in the hole 14.

For example, if one of the wheels 52*a*, 52*b* is positioned on a bump or other uneven surface, the wheel subassembly may be somewhat twisted as a result, due to the weight borne by the wheel. Because of this twisting, the pin 12 may not be removable from the hole 14, or at least, the removal thereof may be impeded due to friction, i.e., due to laterally-directed forces, or side pressures. In these circumstances, an attempt to unlock (i.e., an attempt to withdraw the pin 12 from the hole 14) may result in damage to the wheel lock system 53, for example, to the cables 11*a*, 11*b*, because the cables 11*a*, 11*b* pull the pin 12 out of the hole 14 to unlock (described further below). The control 25 preferably also allows the operator to lock the wheels regardless of the deck position.

The alarm 27 is preferably included in the system 53 because the steering wheels of the vehicle 22 preferably are independent of the wheels 52. Accordingly, it is possible for the operator to attempt to steer the marking assembly 20, when the wheels 52 are locked. Preferably, the alarm 27 is not activated when a relatively small steering adjustment (i.e., a turn up to a maximum permitted angle) is made by the operator. This enables the operator to make relatively small steering adjustments while the wheels are locked, to maintain the marking assembly in alignment with the desired line, if necessary. Preferably, the predetermined angle is between about 5° and about 10°. It is further preferred that the predetermined angle is about 8°.

The alarm 27 is therefore provided, to notify the operator of an attempted sharp turn (i.e., a turn at an angle greater than the permitted angle) while the wheels 52 are locked and the deck 32 is in the lowered position. The alarm is also set to notify the operator if the vehicle's steering wheels are turned sharply with the wheels 52 locked and the deck 32 in the lowered position.

The alarm 27 does not alert the operator if the steering wheels of the vehicle are turned sharply while the deck 32 is in the raised position, i.e., while the wheels 52 are locked.

In one embodiment, therefore, the marking assembly 20 preferably also includes the alarm 27 which, when the wheels 52*a*, 52*b* are in the locked position, is activable upon the vehicle 22 being turned by more than the predetermined angle.

In order to unlock the wheels 52*a*, 52*b*, the following steps are taken. First, the deck 32 is lifted until the wheels 52*a*, 52*b* are disengaged from the ground. In one embodiment, the system 53 preferably includes a micro-switch 19 mounted on one of the lift arms 62*a*, 62*b*, to monitor the position of the deck 32 vis-à-vis the vehicle 22. Preferably, the micro-switch 19 is pre-set to generate a release signal once the deck 32 is raised up to a predetermined height, i.e., a height at which the wheels 52 are disengaged from the ground. Once the deck 32 is raised above the predetermined height, the micro-switch 19 sends the appropriate signal, indicating that the safety control can be released.

Next, the unlock/lock switch is switched to "unlock". This reverses polarity, so that the electric lock activator 10 retracts, pulling the cables 11*a*, 11*b* in the direction indicated by arrow "E", thereby lifting the wheel locking pin 12 out of the bushing hole 14, compressing the lock spring 13. A top part 55 of the pin 12 engages the switch 29.

The indicator switch 21 opens, shutting off the indicator light on the operator control panel 82.

In connection with marking a straight line 28 defined by the center line 49, the position of the deck 32 in front of the vehicle 22 (and therefore in front of the operator) enables the operator to see the center line 49 which indicates where the line 28 is to be marked. This arrangement is therefore advantageous because it enables the center line 49 to be followed. (It will be understood that, where the new line 28 is to be marked over an old line, the operator follows the old line instead of the center line 49.) However, in practice, when the marking assembly 20 approaches an end (not shown) of the center line 49, the center line 49 is not viewable by the operator. The wheel lock system 53 enables the operator to maintain the marking assembly 20 substantially on line when the center line 49 is not viewable, i.e., near the end of the center line 49.

Also, because of the substantial weight of the deck 32, the wheels 52 tend to be deflected off-line frequently by small bumps or depressions in the field. The wheel lock system 53 also has the benefit that it minimizes the impact of these surface irregularities on the accuracy of the line 28 as marked. In practice, while the wheels are locked, the operator only needs to make minor corrections in direction (in response to surface irregularities) to keep the marking assembly on line.

It will be understood that the line required to be marked (or painted) may not be substantially straight. If the desired line is located so that the marking assembly may be used to mark it, to mark such a line, the deck 52 is lowered, and the mounting bracket 40 is put into the operational position. The operator then guides the marking assembly 20 along the appropriate path.

Preferably, and as schematically illustrated in FIG. 4B, the marking assembly 20 includes a pump 54 for providing the marking agent 24 at a preselected rate of flow to the nozzle 38. A quantity of the marking agent 24 preferably is stored in the marking agent tanks 55*a*, 55*b* which are disposed on the deck housing 39. The marking assembly 20 also preferably includes a controller 56 for controlling the pump 54 to provide the marking agent 24 at the selected rate of flow. In one embodiment, the controller 56 is adapted to select the preselected rate of flow at least partially based on a rate of movement of the marking assembly 20 in the forward direction relative to the field 26. Preferably, the marking assembly also includes valves 57 for controlling the flow of the marking agent 24 to the nozzles 38*a*, 38*b*. The valves 57 may be controlled by the operator (i.e., via a control panel 82, as will be described), and the controller 56 also may be controlled by the operator via the control panel 82.

In practice, it has been found that the front nozzle 38*a* preferably has a slightly larger orifice (not shown) than the rear nozzle 38*b*. As can be seen in FIG. 4A, the front nozzle 38*a* is positioned to direct the marking agent generally downwardly and rearwardly when the marking assembly is moving in the forward direction. Similarly, the rear nozzle 38*b* is positioned to direct the marking agent generally downwardly and forwardly.

In order to achieve a relatively even application of the marking agent, the nozzle 38*a* preferably is adapted to provide a somewhat greater flow of the marking agent than the nozzle 38*b*. Due to the positioning of the nozzles, the difference in the rates of flow out of the nozzles 38*a*, 38*b* respectively results in a more even application. It has been found that, where the flow rates out of the two nozzles are substantially the same, a somewhat greater amount of the marking agent is applied by the rear nozzle 38*b*, tending to result in a somewhat unsatisfactory line.

The marking assembly 20 preferably includes various hydraulic rams and other devices for causing its different components to move as described. However, as would be appreciated by those skilled in the art, the marking assembly 20 may, alternatively, include other motive means, e.g., electric motors, either in addition to or instead of hydraulic systems.

Preferably, the marking assembly 20 also includes the control panel 82 which allows the operator to control the various functions of the assembly 20. Such control panel 82 permits control of, for example, the hydraulic cylinders used to move the deck from the lowered position to the raised position, and activation and de-activation of the grass cutting subassembly 34.

Figure 3E:
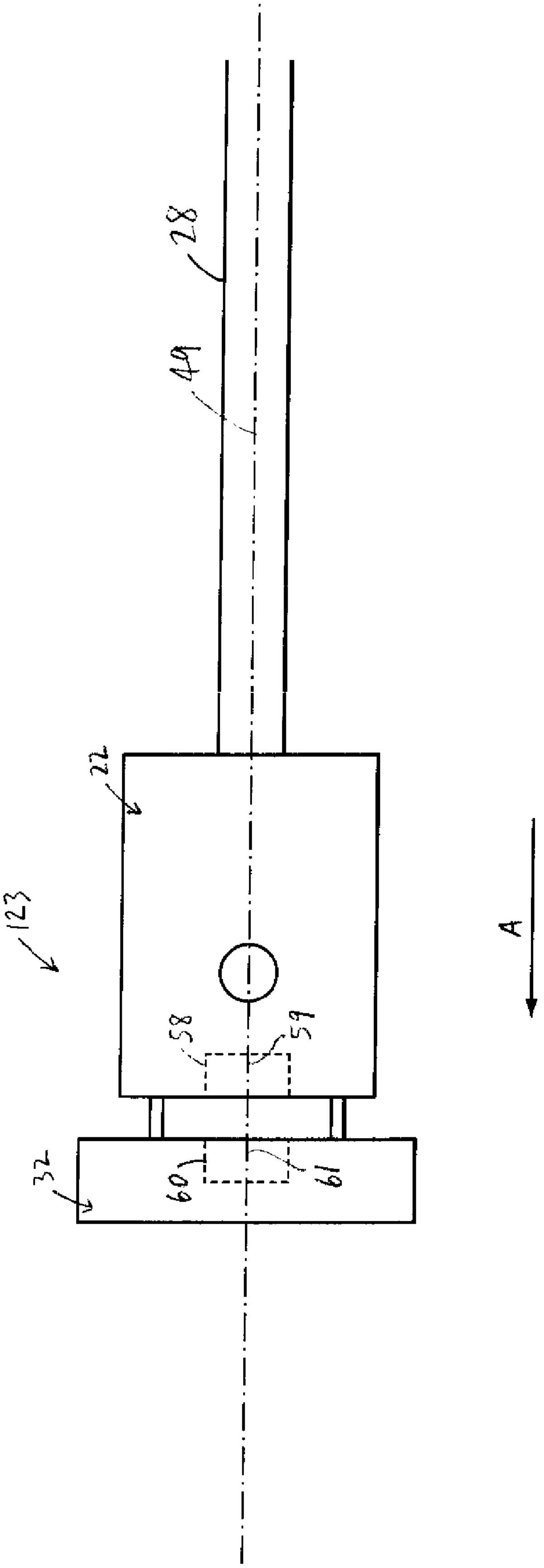
FIG. 3E is a top view of an embodiment of a marking vehicle of the invention, drawn at a smaller scale.

It is also preferred that the marking assembly 20 includes two or more plates 58, 60 mounted on the vehicle 22 and the deck 32 respectively (FIG. 3E). As can be seen in FIG. 3E, the plates 58, 60 preferably include lines 59, 61 thereon respectively which are substantially aligned when the marking assembly 20 is travelling in the forward direction, to facilitate steering the vehicle 22 in the forward direction. The lines 59, 61 are substantially straight. An operator (not shown) adjusts the direction of travel (i.e., via the steering wheel) until the lines 59, 61 are substantially aligned. It is preferred that the plates 58, 60 are at least partially transparent, to facilitate alignment of the lines 59, 61. In one embodiment, the lines 59, 61 preferably are oriented so that the lines 59, 61 are positionable substantially parallel to the forward direction (i.e., arrow A).

In use, where the line 28 is to be marked on a substantially straight predetermined line 49, the operator first positions the marking assembly 20 so that the nozzles 38*a*, 38*b* are substantially aligned with the predetermined line, so as to mark the line 28 thereon. Although this initial alignment may be done in various ways, the nozzles 38*a*, 38*b* preferably are positioned substantially on the predetermined line 49 by using the lines 59, 61 on the plates 58, 60. Once aligned, the operator causes the deck 32 to be moved from the raised position to the lowered position. The wheels 52*a*, 52*b* preferably are then locked into a locked position (FIG. 9). Next, the operator causes the vehicle 22 to move in the forward direction. The grass-cutting subassembly 34 is activated, and the grass is cut by the grass-cutting subassembly 34. As shown in FIG. 3C, the grass is cut so that its top 43 is at a predetermined height above the field's ground surface 47. The grass cuttings are also removed thereby, as is known in the art. The marking agent 24 is pumped to the nozzles 38*a*, 38*b* and released therefrom along the line 28 as the marking subassembly 20 is moved in the forward direction.

When the marking assembly 20 has completed a particular substantially straight line 28, the flow of the marking agent 24 to the nozzles 38*a*, 38*b* is stopped. Also, the grass-cutting subassembly 34 is deactivated, and the deck 32 is moved from the lowered position to the raised position.

It is preferred that, when the deck is in the raised position, the shoes 42*a*, 42*b* are not in contact with the grass. This is because the shoes 42*a*, 42*b* tend to be at least partially covered with the marking agent 24, as described above. If the shoes 42*a*, 42*b* are dragged over the grass when the deck 32 is in the raised position, then the extra paint which has been splattered onto the shoes 42*a*, 42*b* tends to be scraped onto the grass, thereby providing misleading markings on the grass.

Preferably, the wheels 52 are also unlocked, to enable the operator to steer the vehicle so as to position the marking assembly 20 for the next task.

Additional embodiments of the invention are shown in FIGS. 1B and 5-8. In FIGS. 1B and 5-8, elements are numbered so as to correspond to like elements shown in FIGS. 1A, 2A-4C, 9, and 10.

In another embodiment, the invention provides a marking vehicle 123 (FIG. 1B) for releasing the marking agent 24 on a substantially grass-covered field 26 to mark the line 28 in one or more predetermined areas 30 thereof. Preferably, the marking vehicle 123 includes the vehicle portion 22 movable in a forward direction. The forward direction is as indicated by arrow "A" in FIG. 1B. In one embodiment, the marking vehicle 123 also includes the marking assembly 120, including the deck 32 with the grass-cutting subassembly 34 for mowing the grass and removing the cuttings thereof to provide freshly-mown grass in the predetermined area 30 of the field 26. The deck 32 preferably is attached to the vehicle portion 22. It is also preferred that the marking vehicle 123 includes one or more nozzle subassemblies 36 positionable downstream relative to the grass-cutting subassembly 34 when the vehicle portion 122 travels in the forward direction. In addition, the nozzle subassembly 36 preferably includes one or more nozzles 38 for releasing the marking agent 24 to mark the line 28 on the predetermined area 30 of the field.

Preferably, the nozzle subassembly 36 is mounted on the vehicle portion 22. In one embodiment, the marking vehicle 123 additionally includes a movable nozzle subassembly 170 mounted on an arm 172 pivotably attached to the deck 132 at a pivot end 174 thereof for pivoting about an axis 176, to release the marking agent 24 to mark a line 178 at least partially along an arc 180 defined by pivoting movement of the movable nozzle subassembly 170 about the axis 176. The arc 180 along which the movable nozzle subassembly 170 travels is indicated by arrow "F" in FIG. 6.

Figure 6:
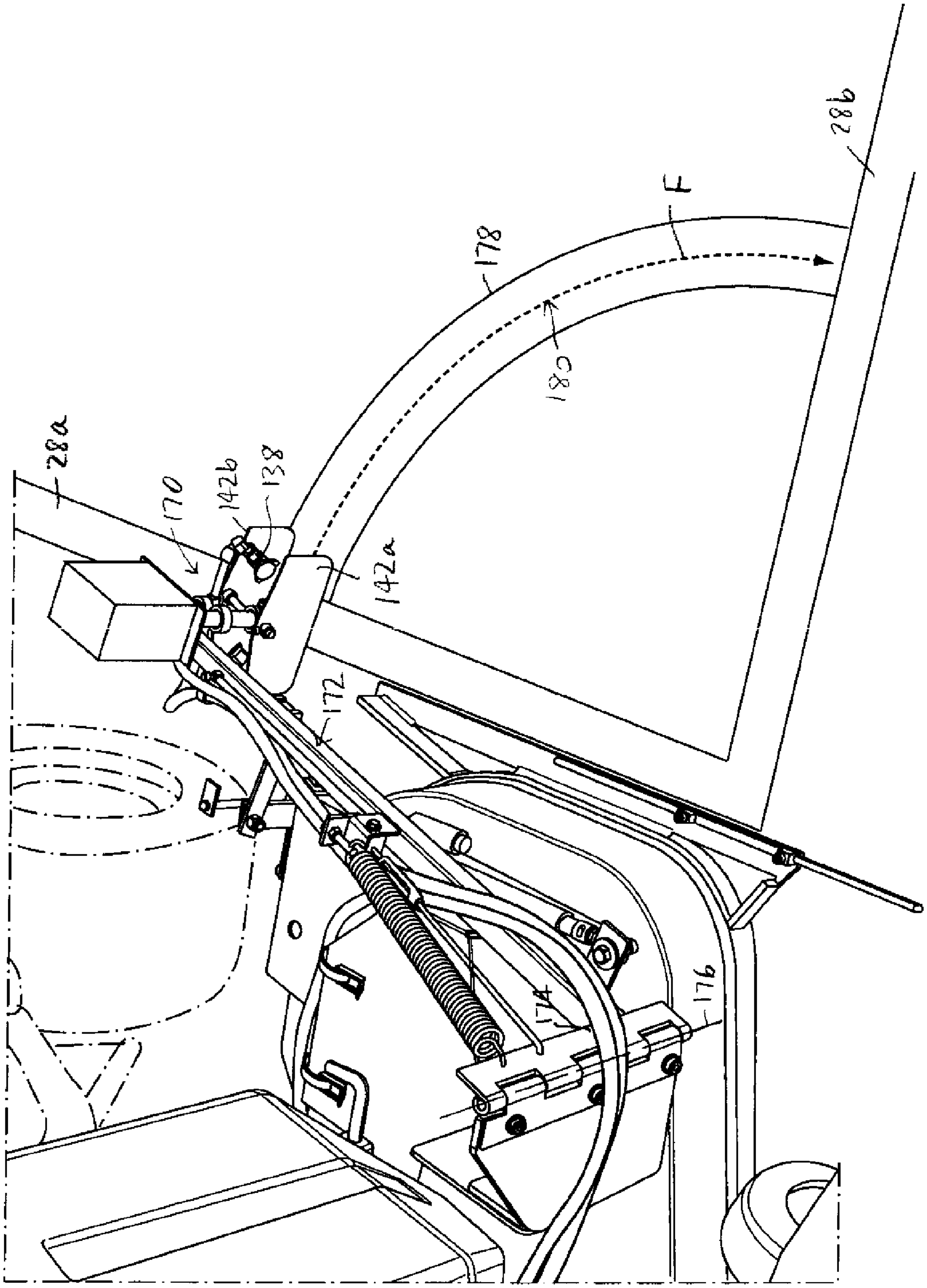
FIG. 6 is another isometric view of the movable nozzle subassembly of FIG. 5.

The movable nozzle subassembly 170 is adapted for applying the marking agent 24 to mark lines which are curved, e.g., certain markings required in corners of the field for the game of soccer. The center line of the exemplary curved line 178 (i.e., on arc 180), bounded by two substantially straight lines 28*a*, 28*b*, is shown in FIG. 6. As can be seen in FIG. 6, in order for the curved line 178 to be marked, the nozzle subassembly 170 is first turned so that shoes 142*a*, 142*b* are positioned at an appropriate angle relative to the arm 172. The nozzles 138*a*, 138*b* are also positioned for alignment with the line 178 so that, as the arm 172 sweeps from the substantially straight line 28*a* toward the substantially straight line 28*b*, the curved line 178 is marked. Because the line 178 is curved, the positions of the nozzles 138*a*, 138*b* and the shoes 142*a*, 142*b* relative to the arm 172 change as the arm 172 moves along the line 178, so as to keep the nozzles 138*a*, 138*b* and the shoes 142*a*, 142*b* substantially aligned with the curved line 178.

It will be appreciated that, in practice, the axis 176 about which the arm 172 pivots preferably is located substantially above the intersection of lines 28*a* and 28*b*. The deck 32 is positioned somewhat offset from the intersection of the lines 28*a*, 28*b* for clarity of illustration.

Figure 1B:
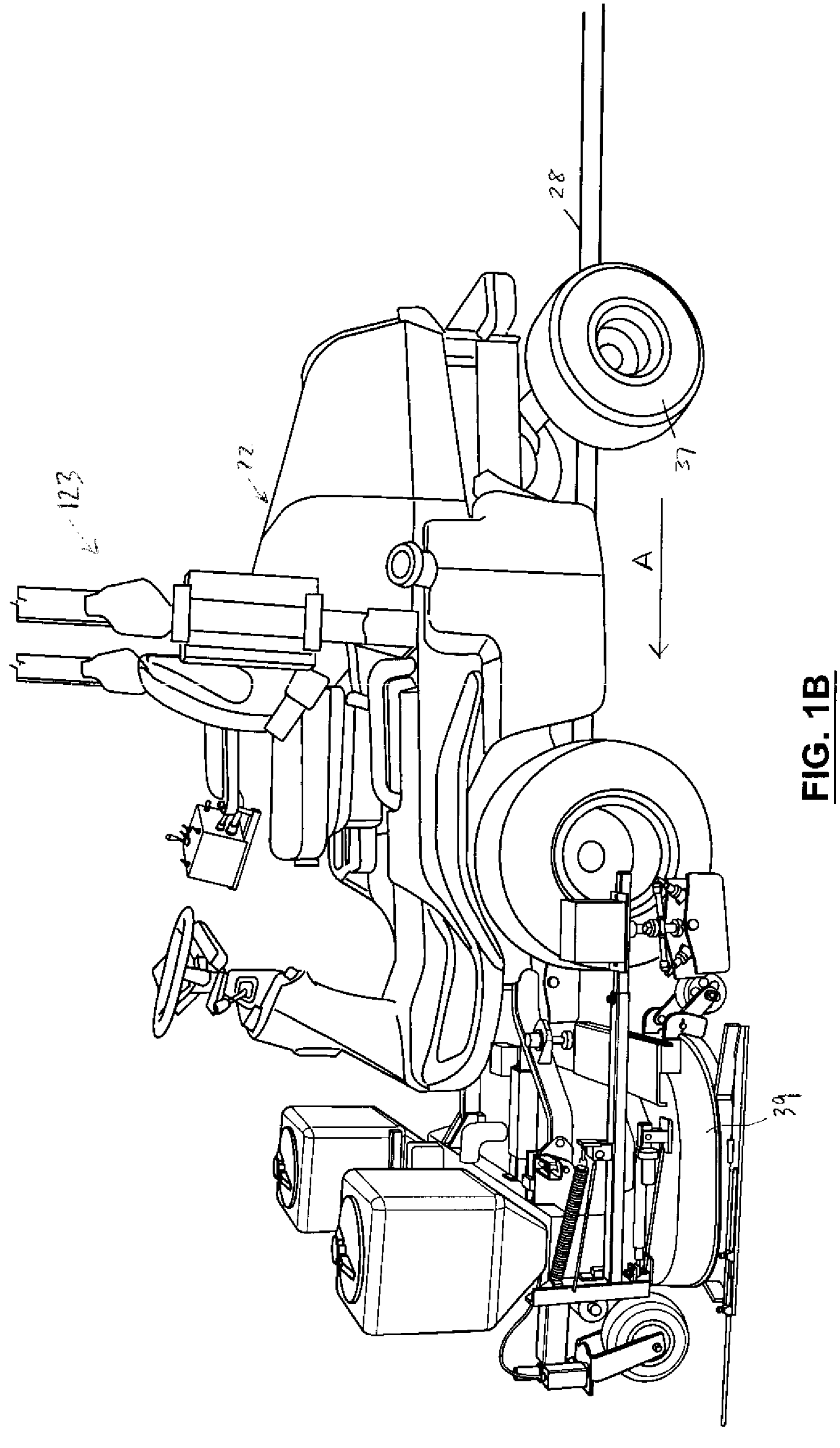

Preferably, movements of the movable nozzle subassembly 170 relative to the arm 172, and movements of the arm 172 relative to the deck 32, are controlled by the operator (not shown) via the control panel 82 (FIG. 1A). It is also preferred that the control of the arm 172 and the movable nozzle subassembly 170 is semi-automated (i.e., automated to an extent). For instance, in one embodiment, the arm 172 is operable in arc line mode or, alternately, in parallel line mode.

Figure 7:
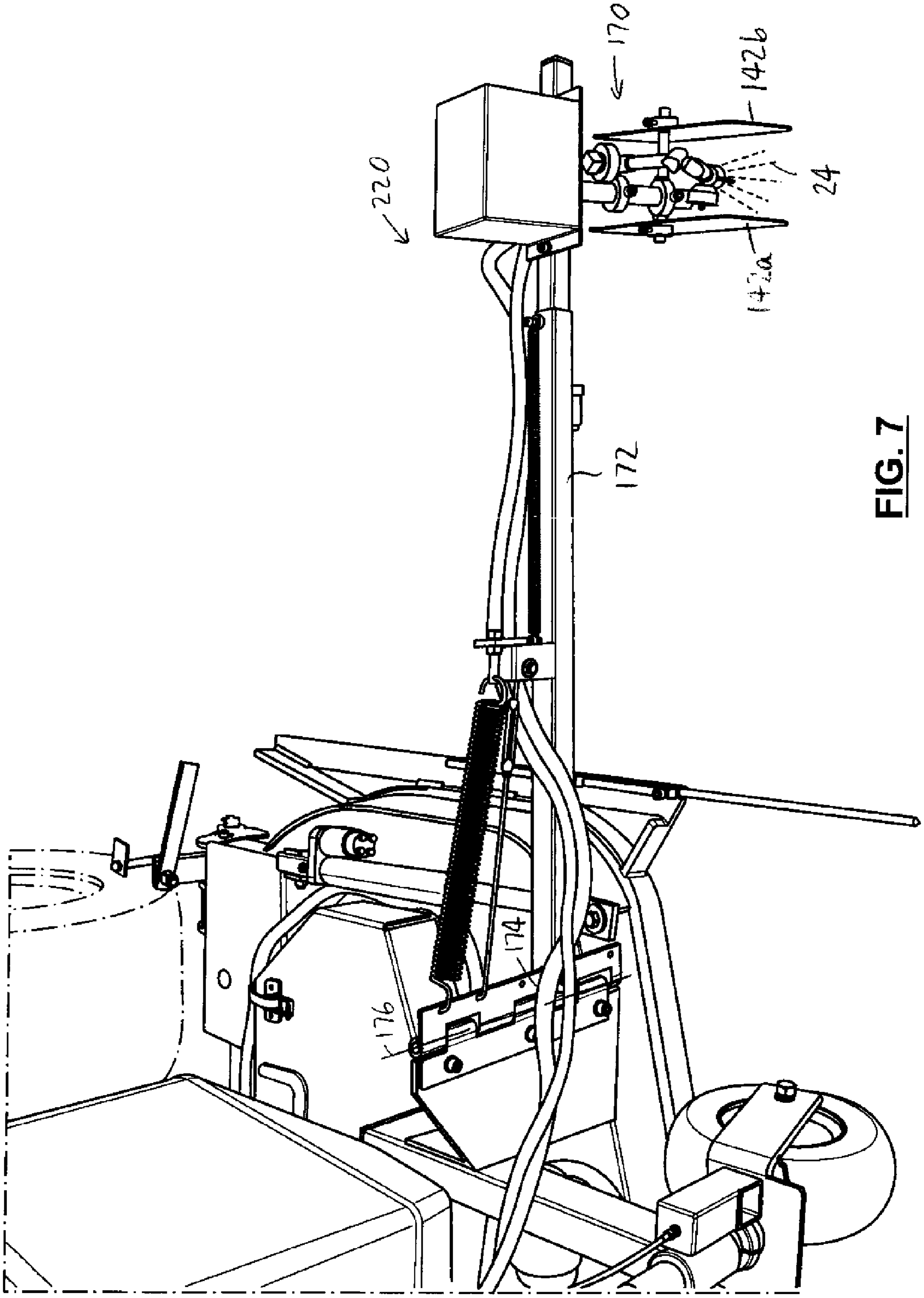
FIG. 7 is another isometric view of the movable nozzle subassembly of FIG. 5.

When the arm 172 is subject to arc line mode, for instance, motive means (not shown) causes the arm 172 to pivot from a "home" position (FIG. 5) to an extended position, shown in FIG. 7. As the arm 172 is so pivoted, the movable nozzle subassembly 170 is moved along the arc 180 (FIG. 6), as described above.

Figure 8:
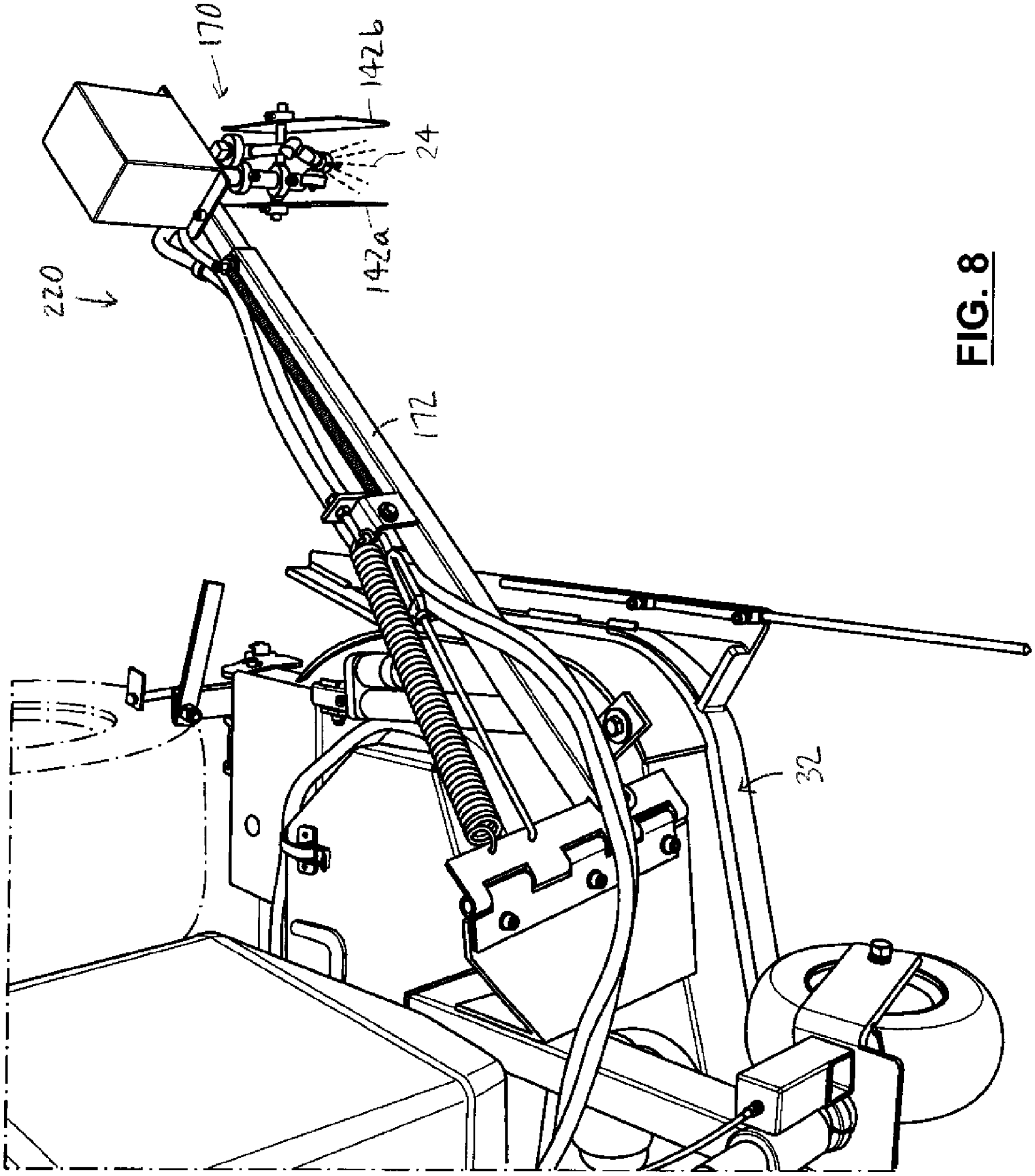
FIG. 8 is another isometric view of the movable nozzle subassembly of FIG. 5.

Alternately, the nozzle subassembly 170 may also be used in the parallel line mode (FIG. 8) to mark a line substantially parallel to the forward direction. The arm 172 is first moved to the desired position, e.g., the position shown in FIG. 8. The movable nozzle subassembly 170 is moved relative to the arm 172 so that the shoes 142*a*, 142*b* are substantially parallel to the forward direction. This mode of operation may be used, for instance, to finish a substantially straight line (not shown) adjacent to an obstacle (e.g., a goalpost) which prevents use of the nozzle subassembly 36. Preferably, in the parallel line mode, the arm 172 is lockable in a position to locate the movable nozzle subassembly 170 at a predetermined position on the arc (FIG. 8).

Figure 5:
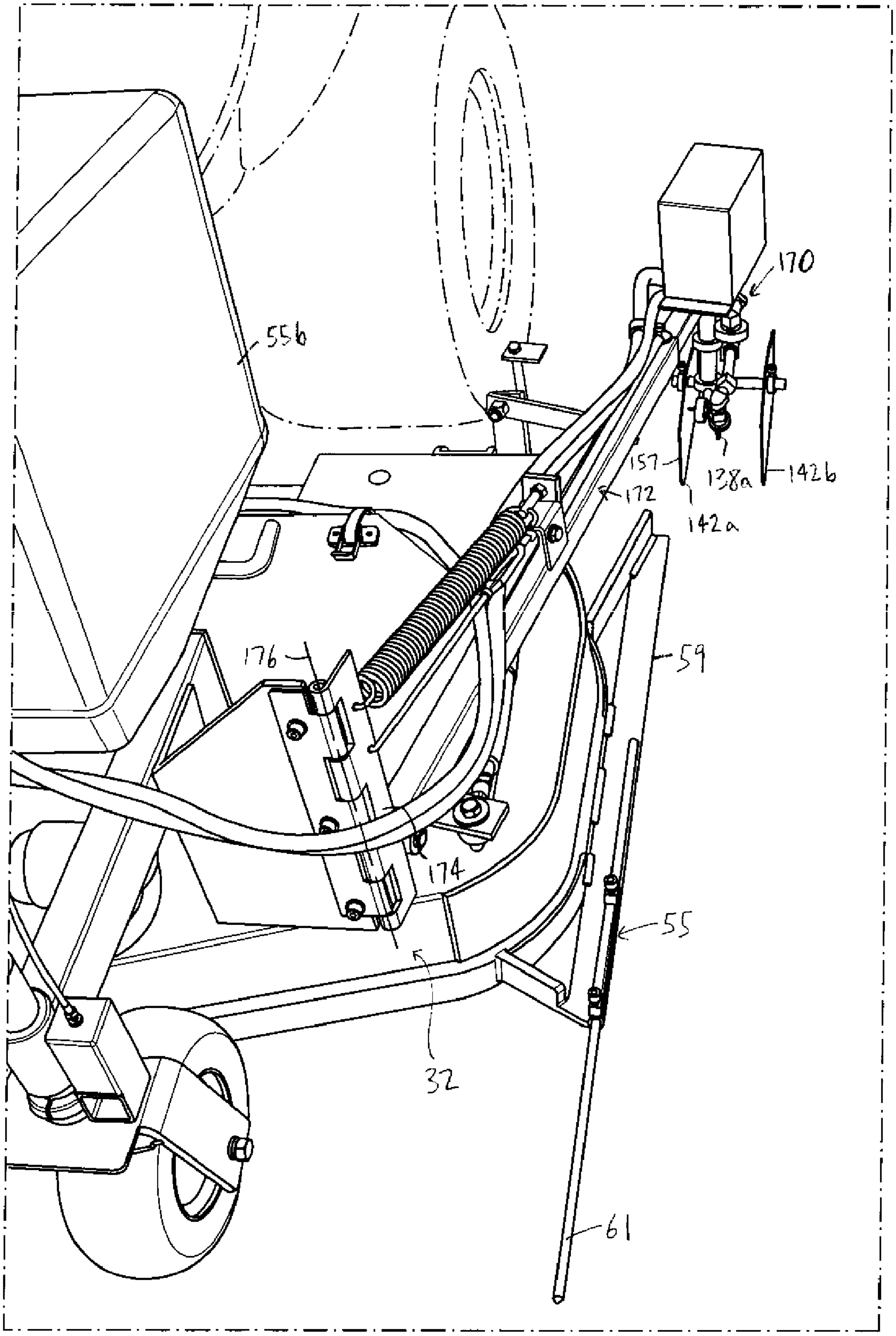
FIG. 5 is an isometric view of an embodiment of a movable nozzle subassembly of the invention and an arm on which the movable nozzle subassembly is mounted, drawn at a smaller scale.

Preferably, in order to mark a line substantially parallel to the forward direction of movement, the arm 172 is positioned as shown in FIG. 5, i.e., so that an inwardly-facing side 157 of the shoe 142*a* is substantially aligned with an outside edge 59 of a guide element 51.

As can be seen in FIG. 5, this arrangement is used where the line to be marked cannot be marked (or is not easily marked) using the nozzles 38*a*, 38*b* which are centrally mounted on the vehicle. For example, the arrangement shown in FIG. 5 is used to mark a goal line which is (in part) positioned adjacent to a goal post (not shown). The operator is able to observe a portion 61 of the guide element 51. When the inwardly-facing side 157 of the shoe 142*a* is substantially aligned with the outer edge 59 of the portion 61 of the guide element 51, the operator aligns the guide element 51 substantially along an edge of a line (not shown) to be marked.

In another embodiment, a marking assembly 220 of the invention preferably includes the movable nozzle subassembly 170 mounted on the arm 172 pivotably attached to the deck 32 at a pivot end 174 thereof for pivoting about the axis 176, to release the marking agent 24 to mark the line 128 at least partially along the arc 180 defined by pivoting movement of the nozzle subassembly 170 about the axis 176 (FIGS. 6, 7). In one embodiment, the marking assembly 220 also includes a nozzle subassembly 236 mounted to the vehicle 22.

As indicated above, the movable nozzle subassembly 170 may be positioned to provide a substantially straight line, parallel to the forward direction (i.e., in the parallel line mode). Preferably, the movable nozzle subassembly 170 is positionable at a predetermined distance from the nozzle subassembly 36 (FIG. 8). Each of the movable nozzle subassembly 170 and the nozzle subassembly 36 are adapted to mark substantially straight lines respectively while the marking assembly 220 travels in the forward direction, so that the lines are marked substantially parallel to each other.

It will be appreciated that the arm may, if preferred, be mounted on the vehicle. However, the arm preferably is mounted so that it opens generally toward the rear of the vehicle, i.e., in a direction generally opposite to the forward direction of travel.

Any element in a claim that does not explicitly state "means for" performing a specific function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. The foregoing descriptions are exemplary, and their scope should not be limited to the specific versions described therein.

I claim:

1. A marking assembly for attachment to a vehicle for distributing a marking agent on a substantially grass-covered field to mark at least one line in at least one predetermined area thereof, the marking assembly comprising:

a deck comprising a grass-cutting subassembly for mowing the grass and removing the cuttings thereof to provide freshly-mown grass in said at least one predetermined area of the field, the deck being attachable to the vehicle;

at least one nozzle subassembly mounted on the vehicle and positioned downstream relative to the grass-cutting subassembly when the vehicle travels in a forward direction, said at least one nozzle subassembly comprising at least one nozzle for releasing the marking agent to mark said at least one line on said at least one predetermined area of the field;

when attached to the vehicle, the deck being movable between a lowered position, in which the grass-cutting subassembly is positioned to cut grass on the field, and a raised position, in which the grass-cutting assembly is positioned to substantially avoid engagement thereof with the grass;

said at least one nozzle subassembly comprising a mounting bracket for attaching said at least one nozzle to the vehicle and at least one shoe for directing the marking agent, upon its release from said at least one nozzle, to mark said at least one line; the mounting bracket additionally comprising at least one member extending between proximal and distal ends thereof, said at least one member being pivotably attached to the vehicle at the proximal end thereof;

said at least one nozzle being attached to said at least one member at a first preselected distance from the proximal end; and at least one connecting element connecting said at least one member at a second preselected distance from the proximal end.

2. A marking assembly according to claim 1 in which said at least one connecting element is adapted for adjustment of the lowered and raised positions.

3. A marking assembly according to claim 1 in which the mounting bracket is positionable in an operational position, in which said at least one nozzle is positioned substantially at a first predetermined height above the field to mark said at least one line thereon when the deck is in the lowered position.

4. A marking assembly according to claim 3 in which the mounting bracket is adapted to remain in the operational position relative to the field during upward movement of the deck.

5. A marking assembly according to claim 1 additionally comprising at least one wheel for at least partially supporting the deck above the field and lockable into a locked position for guiding the deck substantially in the forward direction.

6. A marking assembly according to claim 5 additionally comprising an alarm which, when said at least one wheel is in the locked position, is activated upon the vehicle being turned by more than a predetermined angle.

7. A marking assembly according to claim 1 additionally comprising:

a pump for providing said marking agent at a preselected rate of flow to said at least one nozzle;

a controller for controlling said pump to provide the marking agent at the preselected rate of flow; and the controller being adapted to select the preselected rate of flow at least partly based on a rate of movement relative to the field of the marking assembly in the forward direction.

8. A marking assembly according to claim 1 additionally comprising at least two plates mounted on the vehicle and the deck respectively, said at least two plates comprising markings thereon respectively which are substantially aligned when the marking assembly is travelling in the forward direction, to facilitate steering the vehicle in the forward direction.

9. A marking assembly according to claim 1 additionally comprising a movable nozzle subassembly mounted on an arm pivotably attached to the deck at a pivot end thereof for pivoting about an axis, to release the marking agent to mark a line at least partially along an arc defined by pivoting movement of the nozzle subassembly about the axis.

10. A marking assembly according to claim 1 additionally comprising a movable nozzle subassembly positionable at a predetermined distance from said at least one nozzle subassembly, each of the movable nozzle subassembly and said at least one nozzle subassembly being adapted to mark lines respectively while the marking assembly travels in the forward direction, such that said lines are marked substantially parallel to each other.

11. A marking assembly for attachment to a marking vehicle for releasing a marking agent on a substantially grass-covered field to mark at least one line in at least one predetermined area thereof, the marking assembly comprising:

an arm pivotably attached at a pivot end thereof to the marking vehicle, the arm being adapted to pivot about an axis, the arm extending between the pivot end and a nozzle end thereof;

a movable nozzle subassembly mounted to the arm at the nozzle end, the movable nozzle subassembly comprising at least one nozzle to which the marking agent is supplied, said at least one nozzle being adapted for releasing the marking agent to mark said at least one line on said at least one predetermined area of the field; and the movable nozzle subassembly comprising at least two shoes for directing the marking agent, upon its release from said at least one nozzle, to mark said at least one line.

12. A marking assembly according to claim 11 in which said at least one nozzle is adapted for releasing the marking agent to mark a line at least partially along an arc defined by pivoting movement of the nozzle subassembly about the axis.

13. A marking assembly according to claim 12 in which the arm is lockable to locate the movable nozzle subassembly at a predetermined position on said arc.

14. A marking assembly according to claim 12 in which said at least one movable nozzle subassembly is controllable to mark the line a preselected distance along said arc.

15. A marking vehicle for releasing a marking agent on a substantially grass-covered field to mark at least one line in at least one predetermined area thereof, the marking vehicle comprising:

a vehicle portion movable in a forward direction;

a deck comprising a grass-cutting subassembly for mowing the grass and removing the cuttings thereof to provide freshly-mown grass in said at least one predetermined area of the field, the deck being attachable to the vehicle portion; and at least one nozzle subassembly positioned downstream relative to the grass-cutting subassembly when the vehicle portion travels in the forward direction, said at least one nozzle subassembly comprising at least one first nozzle for releasing the marking agent to mark said at least one line on said at least one predetermined area of the field;

said at least one nozzle subassembly comprising a mounting bracket for attaching said at least one first nozzle to the vehicle and at least one shoe for directing the marking agent, upon its release from said at least one first nozzle, to mark said at least one line;

a movable nozzle subassembly comprising at least one second nozzle mounted on an arm pivotably attached to the deck at a pivot end thereof for pivoting movement about an axis, adapted to release the marking agent from said at least one second nozzle to mark a line at least partially along an arc defined by pivoting movement of the movable nozzle subassembly about the axis; and the movable nozzle subassembly comprising at least two shoes for directing the marking agent, upon its release from said at least one nozzle, to mark said at least one line.

16. A marking vehicle according to claim 15 in which the arm is lockable to locate the movable nozzle subassembly at a predetermined position on said arc.

* * * * *